US009562968B2

(12) United States Patent
Wu

(10) Patent No.: US 9,562,968 B2
(45) Date of Patent: Feb. 7, 2017

(54) SENSOR SYSTEM AND METHOD FOR DETERMINING TARGET LOCATION USING SPARSITY-BASED PROCESSING

(71) Applicant: Saab-Sensis Corporation, East Syracuse, NY (US)

(72) Inventor: Ryan Haoyun Wu, Manlius, NY (US)

(73) Assignee: SAAB-SENSIS CORPORATION, East Syracuse, NY (US)

(*) Notice: Subject to any disclaimer, the term of this patent is extended or adjusted under 35 U.S.C. 154(b) by 414 days.

(21) Appl. No.: 14/060,001

(22) Filed: Oct. 22, 2013

(65) Prior Publication Data

US 2014/0111372 A1 Apr. 24, 2014

Related U.S. Application Data

(60) Provisional application No. 61/716,724, filed on Oct. 22, 2012.

(51) Int. Cl.
| | |
|---|---|
| G01S 13/72 | (2006.01) |
| G01S 7/41 | (2006.01) |
| G01S 3/74 | (2006.01) |
| G01S 7/02 | (2006.01) |
| G01S 13/18 | (2006.01) |
| G01S 13/524 | (2006.01) |
| G01S 7/28 | (2006.01) |
| G01S 7/36 | (2006.01) |

(52) U.S. Cl.
CPC ............ *G01S 13/726* (2013.01); *G01S 3/74* (2013.01); *G01S 7/021* (2013.01); *G01S 7/418* (2013.01); *G01S 13/18* (2013.01); *G01S 13/524* (2013.01); G01S 7/2813 (2013.01); G01S 7/36 (2013.01)

(58) Field of Classification Search
CPC ......................................... G01S 13/72–13/726
See application file for complete search history.

(56) References Cited

U.S. PATENT DOCUMENTS

| | | | |
|---|---|---|---|
| 7,928,893 B2 | 4/2011 | Baraniuk et al. | |
| 8,379,485 B2* | 2/2013 | Cevher ................ | G01S 3/8006 367/128 |
| 8,938,413 B2* | 1/2015 | Horwood ................ | B64G 3/00 706/54 |
| 2003/0058153 A1 | 3/2003 | Yu | |
| 2010/0001901 A1 | 1/2010 | Baraniuk et al. | |
| 2014/0218226 A1* | 8/2014 | Raz ....................... | G01S 13/931 342/70 |

FOREIGN PATENT DOCUMENTS

WO 2008/063691 5/2008

OTHER PUBLICATIONS

Cevher et al. "Distributed Target Localization via Spatial Sparsity" 16th European Signal Processing Conference, 2008. 5 pages. Aug. 25-29, 2008.*

(Continued)

*Primary Examiner* — Matthew M Barker
(74) *Attorney, Agent, or Firm* — Venable, LLP

(57) ABSTRACT

A system and method for an arrayed sensor to resolve ambiguity in received signals, improve direction of arrival accuracy and estimate a location of one or more targets in an environment including signal interference.

12 Claims, 5 Drawing Sheets

(56) References Cited

OTHER PUBLICATIONS

Jamali-Rad et al. "Sparse Multi-Target Localization Using Cooperative Access Points". Sensor Array and Multichannel Signal Processing Workshop (SAM), 2012. pp. 353-356, Jun. 17-20, 2012. doi: 10.1109/SAM.2012.6250509.*

Bowu Zhang et al. "Sparse Target Counting and Localization in Sensor Networks Based on Compressive Sensing" INFOCOM, 2011 Proceedings IEEE. pp. 2255-2263, Apr. 10-15, 2011. doi: 10.1109/INFCOM.2011.5935041.*

International Search Report, International Application No. PCT/US2013/066133, dated Feb. 6, 2014 (11 pages).

Comsa, Ciprian R., et al., "Source Localization Using Time Difference of Arrival within a Sparse Representation Framework," *New Jersey Institute of Technology*, dated 2011, pp. 2872-2875.

Zhao, Yinghui, et al., "Localization of Near-Field Sources in Sonar Data Using the Sparse Representation Framework," *Colorado State University*, dated 2011, (6 pages).

International Preliminary Report on Patentability, International Application No. PCT/US2013/066133, dated May 7, 2015 (7 pages).

* cited by examiner

An Uniform Linear Array (ULA) Formulation Example

SENSOR SYSTEM AND METHOD FOR DETERMINING TARGET LOCATION USING SPARSITY-BASED PROCESSING

FIELD OF THE INVENTION

The present invention provides a sensor system and method for estimating a location of signal of interest, even when the signal is coherently interfered such as due to multipath propagation or signal repeaters. The sensor system can actively transmit signals or remain passive and not transmit any signals. For active systems the signal of interest is the target reflected signal that is transmitted by the sensor system and for passive systems the signal of interest is any incoming known or unknown signals, including jamming and interference signals.

BACKGROUND OF THE INVENTION

Actively transmitting arrayed sensor systems, such as linear or phased array radar system, include multiple transmitting and receiving antenna elements that are arranged in space in the antenna array. For example, a phased-array radar antenna consists of a number of transmitting and receiving antenna elements arranged in space and each antenna element transmits radar signals and receives reflected signals (signal reflections) from targets as well as other items present in the environment. When a target is detected by the radar system, its position is estimated based on the received reflected signals at one or more of the antenna elements. In some radar systems, antenna elements are grouped to formed so called sub-arrays, and the received reflected signals of the group of elements (sub-array) are combined in specific ways to form sub-array signals which are used for detection and estimation of a target. Radar target positions are usually identified by the range, azimuth angle, elevation angle, and Doppler frequency shift space. However, the range resolution, angular resolution, and Doppler resolution are limited by the radar system's signal bandwidth, radar aperture, and signal pulse repetitions. When multiple targets are present in a single radar range, angular, and Doppler resolution cell, the individual targets cannot be distinguished without further processing.

In some environments, signals are transmitted on the same frequency as the transmission frequency of the radar causing interference with the radar reception of reflected signals. These signals may have known waveforms or unknown waveforms, and the transmission of these signals may be inadvertently interfering with the signal reception of the radar or may be deliberately transmitted to interfere with reception of the reflected signals (i.e., jamming the radar receivers) to prevent the radar from detecting and estimating the position of targets.

To overcome interfering signals transmitted by other signal sources and/or jamming signals from radar jammers, some radars will manipulate the array radiation pattern to suppress the interfering and/or jamming signals based on the detected locations of the jammers by its Electronic Support (ES) systems. Other radars use adaptive beam forming techniques that adjust complex weights being applied to element or sub-array signals to suppress the interfering and/or jamming signals without explicitly locating the jammers while extracting the desired target signal. In some environments, the interfering signals and/or jamming signals are also reflected by objects in the environment, resulting in multipath signals arriving at the receivers of the radar. These replicas of the transmitted signals are "coherent," which means they are delayed and complexly attenuated versions of the original transmitted signals, which causes the signal source location estimation process to be even more difficult and require more processing resources.

Since adaptive beam forming signal processing for a sensor system typically involves the use of the covariance of the element signals or sub-array signals, the typical adaptive beam forming signal processing cannot resolve for a location of a signal of interest because coherent interference received with the signal of interest cannot be separated in the Eigen space of the signal covariance matrix. This causes the adaptive beam forming signal processing to be unable to resolve the DoA of the signal of interest from the associated coherent interference including multipath signals arriving at the signal receiving elements of the sensor, and results in the sensor system being unable to estimate the location of the signal of interest.

What is needed is a sensor system that can determine a location of a target, even resolve locations of multiple targets within a defined area, such as a single range-angular-Doppler detection cell for a radar system, or an area bounded in elevation and azimuth for passive signal receiving systems, in environments including a high level of signal interference including multipath signals, and may include jamming signals and associated multipath signals or repeated signals.

SUMMARY OF THE INVENTION

According to a first aspect of the present invention, there is provided a sensor system for estimating a location of a target using a sparse representation framework comprising a plurality of receiving elements for receiving energy signals including an energy signal-of-interest, other transmitted energy signals and coherent interference, and at least one receiver comprising at least one processor using the sparse representation framework for processing the received energy signals, and a sparsity solver for estimating the location of the target. The at least one processor using a sparse representation framework receives received energy signals and separates the energy signal-of-interest present in each snapshot collection window in at least one of a spatial domain, a temporal domain and a frequency domain, so that only the energy signal-of-interest and associated coherent interference are present in a snapshot, converts the energy signal-of-interest and associated coherent interference present in each snapshot from an energy signal in a time domain to an energy signal in a frequency domain, divides the energy signal in the frequency domain in each snapshot with a reference signal which is not equal to 0, and arranges a search grid around an area defined an angle $\theta$ and a delay $\tau$ on an at least 2-D grid. The at least one processor then forms matrix vector equations using a signal model matrix, and applies the sparsity solver to solve the matrix vector equations to estimate a location of the target.

In some embodiments of the present invention, the energy signal-of-interest is a single signal-of-interest transmitted by the target and includes associated coherent interference, and to passively estimate the location of the target the at least one processor using a sparse representation framework arranges a search grid around an area defined an angle $\theta$ and a delay $\tau$ on the at least 2-D grid, where a frequency domain measurement ratio term for angle $\theta$ is represented as follows:

$$r_{n,m} = \frac{\sum_{k=1}^{K}\sum_{l=1}^{L}\alpha_{k,l}e^{-j2\pi f_m(\tau_k-\Delta t_{n,l})}}{\sum_{k=1}^{K}\sum_{l=1}^{L}\alpha_{k,l}e^{-j2\pi f_m(\tau_k-\Delta t_{n0,1})}}$$

calculates all possible values for term $(\tau_k-\Delta t_{n,1})$ based on the search space defined by values of angle $\theta$ and values of delay $\tau$, sorts the calculated values for the term $(\tau_k-\Delta t_{n,1})$ from small to large and denotes the sorted calculated values for the term $(\tau_k-\Delta t_{n,1})$ from small to large as follows:

$$\{\epsilon_{n,1}, \epsilon_{n,2} \ldots \epsilon_{n,V}\}$$

where V=KL and the corresponding amplitudes are denoted as $\{\beta_1, \beta_2, \ldots \beta_V\}$, which belong to the set of amplitudes $\alpha$, and the terms corresponding to $(\tau_k-\Delta t_{n0,1})$ are now denoted as $\{\epsilon_{n0,1}, \epsilon_{n0,2}, \ldots \epsilon_{n0,V}\}$, and are arranged based on the sorting sequence of the calculated values for $(\tau_k-\Delta t_{n,1})$ and are not necessarily in an ascending order, rearranges the spectrum ratio equation using the new notations to obtain the following homogeneous spectrum ratio equation in matrix vector form, $$\underbrace{\begin{bmatrix} \varphi_{11} & \cdots & \varphi_{V1} \\ \vdots & \ddots & \vdots \\ \varphi_{1M} & \cdots & \varphi_{VM} \end{bmatrix}}_{\varphi} \underbrace{\begin{bmatrix} \beta_1 \\ \vdots \\ \beta_V \end{bmatrix}}_{\beta} = \begin{bmatrix} 0 \\ \vdots \\ 0 \end{bmatrix}$$

and the sparsity solver solves for $\beta$, and estimates a location of the target transmitting the signal-of-interest where the solution of $\beta$ is spanned by the null space of $\phi$, a correct $\beta$ is sparse, and $\beta$ cannot be zero. In some of these embodiments, to solve for $\beta$, the sparsity solver selects a $\beta_U$ that is not zero and is a member of $\beta$ and divides the homogeneous spectrum ratio equation with the selected $\beta_U$ value as follows:

$$\frac{\beta_1}{\beta_U}\varphi_{1m} + \frac{\beta_2}{\beta_U}\varphi_{2m} + \ldots + \frac{\beta_V}{\beta_U}\varphi_{Vm} = -\varphi_{Um}$$

solves for $\rho_i$, which is a function of $\beta$ and $\beta_U$, as shown below:

$$\underbrace{\begin{bmatrix} \phi_{11} & \cdots & \phi_{V-1,1} \\ \vdots & \ddots & \vdots \\ \phi_{1M} & \cdots & \phi_{V-1,M} \end{bmatrix}}_{\varphi} \underbrace{\begin{bmatrix} \rho_1 \\ \vdots \\ \rho_{V-1} \end{bmatrix}}_{\rho} = \begin{bmatrix} -\varphi_{U1} \\ \vdots \\ -\varphi_{UM} \end{bmatrix}$$

where $\rho_i = \beta_{i1}/\beta_U$ and $i \neq U$ $\phi_{jm} \in \{\phi_{im}\text{'s}, i \neq U\}$ and applies the sparsity solver using at least one known sparsity estimation approach to estimate a location of the target transmitting of the signal-of-interest where $\rho_i$ is sparse, and an angle of arrival and delay $\tau$ of each signal-of-interest corresponds to the $\rho_i$ having a significant value with the smallest delay $\tau$.

In other embodiments of the present invention, the energy signal-of-interest is multiple signals-of-interest having a single waveform and includes associated coherent interference, and to actively estimate the location of the target further comprises at least one transmitter for transmitting an energy signal in at least one direction, the energy signal reflecting off of at least the target, and the at least one processor using a sparse representation framework detects the target in an azimuth-elevation-range resolution cell and establishes a three-dimension (3-D) grid covering an area including the azimuth-elevation-range resolution cell containing the one or more targets, and reforms the target location estimation problem into a linear angle-excess range estimation problem for the target represented in the general form:

$$Ax = y$$

where x is a solution vector, A is a matrix of known functions, and y is a vector from observation. The at least one processor using a sparse representation framework then forms a number of measurement equations, the number of measurement equation being equal to N×M, where N is the number of outputs from receiving elements of the sensor array, and M is the number of frequency sampling points available, forms a matrix based on the N×M measurement equations for the solution vector y and a K×L search space in the 3-D grid, forms a 3-D image of the K×L search space, where the solution vector x for the target on the 3-D image is sparse when a number of grid points within the K×L search space is much greater than a number of grid points P having a value above a noise floor of the K×L search space (KL>>P), and applies the sparsity solver to solve the matrix for the solution vector x to estimate the location of the target. In some of these embodiments, the measurement equations are matrix-vector equations represented in a form of, an active signal model matrix*target vector=measurement vector, where the active signal model matrix is constructed using an array model of the receiving element of the sensor system and a 3-D search grid covering azimuth, elevation, and excess range dimensions of the resolution cell in which the target was detected, the target vector is a sparse vector to be estimated, and the measurement vector includes a sampling of the received energy signals in the frequency domain, and the 3-D image of the K×L search space for the estimated target vector is formed relative to the earliest arriving received energy signal for the target using the azimuth angle, elevation angle and excess delay of each element having the energy level above the predetermined energy threshold level for the estimated target vector.

In some embodiments, the energy signal having a known waveform used for normalizing the received energy signals in the frequency domain in each snapshot collection window is the energy signal of known waveform transmitted by the transmitter and the normalized received reflected energy signals in the frequency domain is represented as follows:

$$r_{n,m'} = \frac{S_n(f_{m'})}{S(f_{m'})} = \sum_{i=1}^{P}\alpha_i e^{-j2\pi f_{m'}(\tau_i-\Delta t_{n,i})} + \frac{W_n(f_{m'})}{S(f_{m'})}$$

$$\Rightarrow r_{n,m} =$$

$$\sum_{i=1}^{P}\alpha_i e^{-j2\pi f_m(\tau_i-\Delta t_{n,1})} = \begin{bmatrix} e^{-j2\pi f_m(\tau_1-\Delta t_{n,1})} & \cdots & e^{-j2\pi f_m(\tau_P-\Delta t_{n,P})} \end{bmatrix} \begin{bmatrix} \alpha_1 \\ \vdots \\ \alpha_P \end{bmatrix}$$

wherein $m \in \{m'\}$ s.t. $S(f_m) >>$ noise power for n=0 . . . N−1 and m=1 . . . M.

In some of these embodiments, after forming the N×M matrix-vector equations, the at least one processor arranges a fine search grid around an area defined by an angle and an associated range in the 3-D grid, and the matrix formed based on the N×M measurements of vector y and a K×L search space is a linear angle-excess range estimation matrix in the following form:

$$y = \begin{bmatrix} e^{-j2\pi f_1(\tau_1 - \Delta t_{1,1})} & \cdots & e^{-j2\pi f_1(\tau_K - \Delta t_{1,L})} \\ \vdots & & \\ e^{-j2\pi f_m(\tau_1 - \Delta t_{n,1})} & \cdots & e^{-j2\pi f_m(\tau_K - \Delta t_{n,L})} \\ \vdots & & \\ e^{-j2\pi f_M(\tau_1 - \Delta t_{N,1})} & \cdots & e^{-j2\pi f_M(\tau_K - \Delta t_{N,L})} \end{bmatrix}_{MN \times KL} \underbrace{\begin{bmatrix} \alpha_{1,1} \\ \vdots \\ \alpha_{k,l} \\ \vdots \\ \alpha_{K,L} \end{bmatrix}}_{x}{}_{KL \times 1}$$

where a sparse solution of x exists when P<<KL where only P elements of the KL elements of x have values above the noise floor, an estimated location of the target on the 3-D map image of the K×L search space is formed with the solution of x, and the sparsity solver estimates a location of the target by solving the matrix for the solution vector x, where the following constraints are satisfied the solution vector x for the target on the 3-D image is sparse, and a number of grid points within the K×L search space is much greater than a number of grid points P having a value above a noise floor of the K×L search space (KL>>P).

In some embodiments, the angle defining the small area is a look angle θ and the range is the associated range R. In other embodiments, to solve for a sparse solution for vector x, the sparsity solver applies L–1 norm minimization to form an unconstrained optimization problem, when y and A are known for equation y=Ax+n, the solution vector x for the target is sparse, and the elements of n are independent Gaussian random variables with a zero mean and a zero variance σ² as follows:

$$x_{est} = \underset{x}{\operatorname{argmin}}(\|x\|_1 + l_{\sigma'}(y - Ax))$$

where the indicator function l is defined as follows:

$$l_{\sigma'}(y - Ax) = \begin{cases} 0 & \text{if } \|y - Ax\|_2 \le \sigma' \\ \infty & \text{if } \|y - Ax\|_2 > \sigma' \end{cases}$$

where a solution of the unconstrained optimization problem must satisfy $$\|y - Hx\|_2 \le \sigma', \text{ and}$$

applies a combination of at least two techniques to solve the unconstrained optimization problem to estimate the location of the target.

In some embodiments, wherein the combination of techniques applied by the sparsity solver to solve the unconstrained optimization problem and estimate a location for the target comprises a variable splitting technique and an augmented Lagrangian technique.

In some of these embodiments, the variable splitting technique reformulates the following unconstrained optimization problem into a constrained optimization problem represented by the following equation, $$\{x_{est}, v_{est}\} = \underset{x,v}{\operatorname{argmin}}(\|v\|_1 + l_{\sigma'}(s)) \text{ subject to } v = x \text{ and } s = y - Ax$$

the augmented Lagrangian technique reformulates the constrained optimization problem shown above as follows, $$\{x_{est}, v_{est}s_{est}\} =$$
$$\underset{x,v,s}{\operatorname{argmin}}(\|v\|_1 + l_{\sigma'}(s) + \mu_1\|v - x - d_1\|_2^2 + \mu_2\|y - Ax - s - d_2\|_2^2)$$

update: $d_1 \leftarrow d_1 - (v_{est} - x_{est})$ update: $d_2 \leftarrow d_2 - (y - Ax_{est} - s_{est})$ where $\mu_1$ and $\mu_2$ are some positive numbers,
and iteratively solves the reformulated equation for values of $x_{est}$, $v_{est}$, and $s_{est}$ to estimate the location of the target.

In other embodiments, the sparsity solver solves for values for $x_{est}$, $v_{est}$, and $s_{est}$ using the following equations:

$$v_{est} =$$
$$\operatorname{soft}(x_{est} + d_1, 1/2\mu_1) = \begin{cases} x_{est} + d_1 1/2\mu_1 & \text{if } x_{est} + d_1 - 1/2\mu_1 \ge 0 \\ 0 & \text{if } 1/2\mu_1 > |x_{est} + d_1| \\ x_{est} + d_1 + 1/2\mu_1 & \text{if } x_{est} + d_1 + 1/2\mu_1 \le 0 \end{cases}$$

$$s_{est} = \begin{cases} y - Ax_{est} - d_2 & \text{if } \|y - Ax_{est} - d_2\|_2 \le \sigma' \\ \sigma' \dfrac{y - Ax_{est} - d_2}{\|y - Ax_{est} - d_2\|_2} & \text{if } \|y - Ax_{est} - d_2\|_2 > \sigma' \end{cases}$$

$$x_{est} = (\mu_1 I + \mu_2 A^H A)^{-1}[\mu_2 A^H(y - s_{est} - d_2) + \mu_1(v_{est} - d_1)],$$

and
iteratively solves these equations using the following procedure:
1. choose $\mu_1$ and $\mu_2$ and initialize $x_{est}$, $d_1$ and $d_2$
2. solve $$v_{est} = \underset{v}{\operatorname{argmin}}\|v\|_1 + l_{\sigma'}(s) + \mu_1\|v - x - d_1\|_2^2$$
$$s_{est} = \underset{s}{\operatorname{argmin}} l_{\sigma'}(s) + \mu_2\|y - Ax - s - d_2\|_2^2$$
$$x_{est} = \underset{x}{\operatorname{argmin}} \mu_1\|v_{est} - x - d_1\|_2^2 + \mu_2\|y - Ax - s_{est} - d_2\|_2^2$$

3. updated: $d_1 \leftarrow d_1 - (v_{est} - x_{est})$
  update: $d_2 \leftarrow d_2 - (y - Ax_{est} - s_{est})$
4. and repeat steps 1-3 until the location of the target is estimated.

According to a second aspect of the present invention, there is provided a sensor system for estimating a location of a target using a sparse representation framework where at least one interfering transmitter is transmitting an interfering signal. The system comprising at least one transmitter for transmitting an energy signal in at least one direction, the energy signal reflecting off of at least the target, at least one interfering transmitter for transmitting an interfering energy signal, a plurality of receiving elements for receiving energy signals including an energy signal-of-interest, the energy signal reflecting off of at least the target, transmitted interfering energy signals and coherent interference, and at least one receiver comprising at least one processor using the sparse representation framework for processing the received energy signals, and a sparsity solver for estimating the location of the interfering transmitter transmitting the interfering signal passively and the location of the target actively.

To passively estimate the location of the interfering transmitter transmitting the interfering signal the at least one processor using a sparse representation framework receives energy signals and separates the interfering energy signal present in each snapshot collection window in at least one of a spatial domain, a temporal domain and a frequency domain, so that only the interfering energy signal and associated coherent interference are present in a snapshot, converts the interfering energy signal and associated coherent interference present in each snapshot from an energy signal in a time domain to an energy signal in a frequency domain, divides the energy signal in the frequency domain in each snapshot with a reference signal which is not equal to 0, and arranges a search grid around an area defined an angle $\theta$ and a delay $\tau$ on the at least 2-D grid, where a frequency domain measurement ratio term for angle $\theta$ is represented as follows:

$$r_{n,m} = \frac{\sum_{k=1}^{K}\sum_{l=1}^{L} \alpha_{k,l} e^{-j2\pi f_m(\tau_k - \Delta t_{n,l})}}{\sum_{k=1}^{K}\sum_{l=1}^{L} \alpha_{k,l} e^{-j2\pi f_m(\tau_k - \Delta t_{n0,l})}}$$

The at least one processor using a sparse representation framework then calculates all possible values for term $(\tau_k - \Delta t_{n,1})$ based on the search space defined by values of angle $\theta$ and values of delay r, sorts the calculated values for the term $(\tau_k - \Delta t_{n,1})$ from small to large and denotes the sorted calculated values for the term $(\tau_k - \Delta t_{n,1})$ from small to large as follows, $\{\epsilon_{n,1}, \epsilon_{n,2}, \ldots, \epsilon_{n,V}\}$, where V=KL and the corresponding amplitudes are denoted as $\{\beta_1, \beta_2, \ldots, \beta_V\}$, which belong to the set of amplitudes $\alpha$, and the terms corresponding to $(\tau_k - \Delta t_{n0,1})$ are now denoted as $\{\epsilon_{n0,1}, \epsilon_{n0,2}, \ldots \epsilon_{n0,V}\}$ and are arranged based on the sorting sequence of the calculated values for $(\tau_k - \Delta t_{n,1})$ and are not necessarily in an ascending order, rearranges the spectrum ratio equation using the new notations to obtain the following homogeneous spectrum ratio equation in matrix vector form:

$$\underbrace{\begin{bmatrix} \varphi_{11} & \cdots & \varphi_{V1} \\ \vdots & \ddots & \vdots \\ \varphi_{1M} & \cdots & \varphi_{VM} \end{bmatrix}}_{\varphi} \underbrace{\begin{bmatrix} \beta_1 \\ \vdots \\ \beta_V \end{bmatrix}}_{\beta} = \begin{bmatrix} 0 \\ \vdots \\ 0 \end{bmatrix}$$

the sparsity solver solves for $\beta$, and estimates a location of the interfering transmitter transmitting the interfering signal, where the solution of $\beta$ is spanned by the null space of $\phi$, a correct $\beta$ is sparse, and $\beta$ cannot be zero.

To actively estimate the location of the target the at least one processor using a sparse representation framework applies spatial nulling to suppress the interfering energy signal transmitted from the estimated location of the target transmitting the interfering energy signal, detects the target in an azimuth-elevation-range resolution cell and establishes a three-dimension (3-D) grid covering an area including the azimuth-elevation-range resolution cell containing the one or more targets, and reforms the target location estimation problem into a linear angle-excess range estimation problem for the target represented in the general form:

$$Ax = y$$

where x is a solution vector, A is a matrix of known functions, and y is a vector from observation. The at least one processor using a sparse representation framework then forms a number of measurement equations, the number of measurement equation being equal to N×M, where N is the number of outputs from receiving elements of the sensor array, and M is the number of frequency sampling points available, forms a matrix based on the N×M measurement equations for the solution vector y and a K×L search space in the 3-D grid, forms a 3-D image of the K×L search space, where the solution vector x for the target on the 3-1) image is sparse when a number of grid points within the K×L search space is much greater than a number of grid points P having a value above a noise floor of the K×L search space (KL>>P), and applies the sparsity solver to solve the matrix for the solution vector x to estimate a location of the target.

According to a third aspect of the present invention, there is provided a method for estimating a location of a target using a sparse representation framework comprising receiving energy signals including an energy signal-of-interest, other transmitted energy signals and coherent interference, and processing the received energy signals in at least one processor using a sparse representation framework comprising receiving received energy signals and separating the energy signal-of-interest present in each snapshot collection window in at least one of a spatial domain, a temporal domain and a frequency domain, so that only the energy signal-of-interest and associated coherent interference are present in a snapshot, converting the energy signal-of-interest and associated coherent interference present in each snapshot from an energy signal in a time domain to an energy signal in a frequency domain, dividing the energy signal in the frequency domain in each snapshot with a reference signal which is not equal to 0, arranging a search grid around an area defined an angle $\theta$ and a delay $\tau$ on an at least 2-D grid, forming matrix vector equations using a signal model matrix, and applying a sparsity solver to solve the matrix vector equations to estimate a location of the target.

In some embodiments of the present invention, the energy signal-of-interest is a single signal-of-interest transmitted by the target and includes associated coherent interference, and to passively estimate the location of the target further comprises arranging a search grid around an area defined an angle $\theta$ and a delay $\tau$ on the at least 2-D grid, where a frequency domain measurement ratio term for angle $\theta$ is represented as follows:

$$r_{n,m} = \frac{\sum_{k=1}^{K}\sum_{l=1}^{L} \alpha_{k,l} e^{-j2\pi f_m(\tau_k - \Delta t_{n,l})}}{\sum_{k=1}^{K}\sum_{l=1}^{L} \alpha_{k,l} e^{-j2\pi f_m(\tau_k - \Delta t_{n0,l})}}$$

calculating all possible values for term $(\tau_k - \Delta t_{n,1})$ based on the search space defined by values of angle $\theta$ and values of delay $\tau$, sorts the calculated values for the term $(\tau_k - \Delta t_{n,1})$ from small to large and denotes the sorted calculated values for the term $(\tau_k - \Delta t_{n,1})$ from small to large as follows, $\{\epsilon_{n,1}, \epsilon_{m,2}, \ldots \epsilon_{n,V}\}$, where V=KL and the corresponding amplitudes are denoted as $\{\epsilon_1, \epsilon_2, \ldots, \beta_V\}$, which belong to the set of amplitudes $\alpha$, and the terms corresponding to $(\tau_k - \Delta t_{n0,1})$ are now denoted as $\{\epsilon_{n0,1}, \epsilon_{n0,2}, \ldots, \epsilon_{n0,V}\}$, and are arranged based on the sorting sequence of the calculated values for $(\tau_k - \Delta t_{n,1})$ and are not necessarily in an ascending order, rearranging the spectrum ratio equation using the new notations to obtain the following homogeneous spectrum ratio equation in matrix vector form:

$$\underbrace{\begin{bmatrix} \varphi_{11} & \cdots & \varphi_{V1} \\ \vdots & \ddots & \vdots \\ \varphi_{1M} & \cdots & \varphi_{VM} \end{bmatrix}}_{\varphi} \underbrace{\begin{bmatrix} \beta_1 \\ \vdots \\ \beta_V \end{bmatrix}}_{\beta} = \begin{bmatrix} 0 \\ \vdots \\ 0 \end{bmatrix}$$

and solving for β using the sparsity solver to estimate a location of the target transmitting the signal-of-interest where the solution of β is spanned by the null space of ϕ, a correct β is sparse, and β cannot be zero.

In other embodiments, solving for β further comprises selecting a $\beta_u$ value that is not zero and is a member of β and divides the homogeneous spectrum ratio equation with the selected $\beta_u$ as follows:

$$\frac{\beta_1}{\beta_U}\varphi_{1m} + \frac{\beta_2}{\beta_U}\varphi_{2m} + \ldots + \frac{\beta_V}{B_U}\varphi_{Vm} = -\varphi_{Um}$$

solving for $\rho_i$, which is a function of β and $\beta_u$, as shown below:

$$\underbrace{\begin{bmatrix} \varphi_{11} & \cdots & \varphi_{V-1,1} \\ \vdots & \ddots & \vdots \\ \varphi_{1M} & \cdots & \varphi_{V-1,M} \end{bmatrix}}_{\varphi} \underbrace{\begin{bmatrix} \rho_1 \\ \vdots \\ \rho_{V-1} \end{bmatrix}}_{\rho} = \begin{bmatrix} -\varphi_{U1} \\ \vdots \\ -\varphi_{UM} \end{bmatrix}$$

where $\rho_i = \beta_{i1}/\beta_U$ and $i \neq U$ $\phi_{jm} \in \{\varphi'_{im}s, i \neq U\}$ and applying at least one known sparsity estimation approach to estimate a location of the target transmitting of the signal-of-interest where $\rho_i$ is sparse, and an angle of arrival and delay τ of each signal-of-interest corresponds to the $\rho_i$ having a significant value with the smallest delay τ.

In some embodiments, the energy signal-of-interest is multiple signals-of-interest having a single waveform and includes associated coherent interference, and to actively estimate the location of the target further comprises transmitting an energy signal in at least one direction, the energy signal reflecting off of at least the target, detecting the target in an azimuth-elevation-range resolution cell and establishes a three-dimension (3-D) grid covering an area including the azimuth-elevation-range resolution cell containing the one or more targets, and reforming the target location estimation problem into a linear angle-excess range estimation problem for the target represented in the general form:

Ax=y where x is a solution vector, A is a matrix of known functions, and y is a vector from observation. The method further comprises forming a number of measurement equations, the number of measurement equation being equal to N×M, where N is the number of outputs from receiving elements of the sensor array, and M is the number of frequency sampling points available, forming a matrix based on the N×M measurement equations for the solution vector y and a K×L search space in the 3-D grid, forming a 3-D image of the K×L search space, where the solution vector x for the target on the 3-D image is sparse when a number of grid points within the K×L search space is much greater than a number of grid points P having a value above a noise floor of the K×L search space (KL>>P), and solving the matrix for the solution vector x using the sparsity solver to estimate the location of the target.

In some embodiments, the measurement equations are matrix-vector equations represented in a form of an active signal model matrix*target vector=measurement vector, where the active signal model matrix is constructed using an array model of the receiving element of the sensor system and a 3-D search grid covering azimuth, elevation, and excess range dimensions of the resolution cell in which the target was detected, the target vector is a sparse vector to be estimated, the measurement vector includes a sampling of the received energy signals in the frequency domain, and the 3-D image of the K×L search space for the estimated target vector is formed relative to the earliest arriving received energy signal for the target using the azimuth angle, elevation angle and excess delay of each element having the energy level above the predetermined energy threshold level for the estimated target vector.

In other embodiments, the energy signal having a known waveform used for normalizing the received energy signals in the frequency domain in each snapshot collection window is the energy signal of known waveform transmitted by the transmitter and the normalized received reflected energy signals in the frequency domain is represented as follows:

$$r_{n,m'} = \frac{S_n(f_{m'})}{S(f_{m'})} = \sum_{i=1}^{P} \alpha_i e^{-j2\pi f_{m'}(\tau_i - \Delta t_{n,i})} + \frac{W_n(f_{m'})}{S(f_{m'})}$$

$$\Rightarrow r_{n,m} =$$

$$\sum_{i=1}^{P} \alpha_i e^{-j2\pi f_m(\tau_i - \Delta t_{n,i})} = \begin{bmatrix} e^{-j2\pi f_m(\tau_1 - \Delta t_{n,1})} & \cdots & e^{-j2\pi f_m(\tau_P - \Delta t_{n,P})} \end{bmatrix} \begin{bmatrix} \alpha_1 \\ \vdots \\ \alpha_P \end{bmatrix}$$

where m∈{m'} s.t. $S(f_m)$>>noise power
for n=0 . . . N−1 and m=1 . . . M.
and after forming the N×M matrix-vector equations, the method further comprises arranging a fine search grid around an area defined by an angle and an associated range in the 3-D grid, and forming the matrix based on the N×M measurements of vector y and a K×L search space is a linear angle-excess range estimation matrix in the following form:

$$y = \underbrace{\begin{bmatrix} e^{-j2\pi f_1(\tau_1 - \Delta t_{1,1})} & \cdots & e^{-j2\pi f_1(\tau_K - \Delta t_{1,L})} \\ \vdots & & \vdots \\ e^{-j2\pi f_m(\tau_1 - \Delta t_{n,1})} & \cdots & e^{-j2\pi f_m(\tau_K - \Delta t_{n,L})} \\ \vdots & & \vdots \\ e^{-j2\pi f_M(\tau_1 - \Delta t_{N,1})} & \cdots & e^{-j2\pi f_M(\tau_K - \Delta t_{N,L})} \end{bmatrix}}_{A, MN \times KL} \underbrace{\begin{bmatrix} \alpha_{1,1} \\ \vdots \\ \alpha_{k,l} \\ \vdots \\ \alpha_{K,L} \end{bmatrix}}_{x, KL \times 1}$$

where a sparse solution of x exists when P<<KL where only P elements of the KL elements of x have values above the noise floor, an estimated location of the target on the 3-D map image of the K×L search space is formed with the solution of x, and solving the matrix for the solution vector x using the sparsity solver to estimate the location of the target, where the following constraints are satisfied the solution vector x for the target on the 3-D image is sparse, and a number of grid points within the K×L search space is much greater than a number of grid points P having a value above a noise floor of the K×L search space (KL>>P).

In some embodiments, solving for a sparse solution for vector x, the sparsity solver applies L-1 norm minimization to form an unconstrained optimization problem, when y and A are known for equation y=Ax+n, the solution vector x for the target is sparse, and the elements of n are independent Gaussian random variables with a zero mean and a zero variance $\sigma^2$ as follows:

$$x_{est} = \operatorname*{argmin}_{x}(\|x\|_1 + l_{\sigma'}(y - Ax))$$

where: the indicator function l is defined as follows:

$$l_{\sigma'}(y - Ax) = \begin{cases} 0 & \text{if} \|y - Ax\|_2 \leq \sigma' \\ \infty & \text{if} \|y - Ax\|_2 > \sigma' \end{cases}$$

where: a solution of the unconstrained optimization problem must satisfy $$\|y - Hx\|_2 \leq \sigma'; \text{ and}$$

applies a combination of at least two techniques to solve the unconstrained optimization problem to estimate the location of the target.

In some of these embodiments, solving the unconstrained optimization problem further comprises reformulating the unconstrained optimization problem into a constrained optimization problem represented by the following equation:

$$\{x_{est}, v_{est}\} = \operatorname*{argmin}_{x,v}(\|v\|_1 + l_{\sigma'}(s)) \text{ subject to } v = x \text{ and } s = y - Ax$$

reformulating the constrained optimization problem shown above as follows:

$$\{x_{est}, v_{est}, s_{est}\} =$$

$$\operatorname*{argmin}_{x,v,s}(\|v\|_1 + l_{\sigma'}(s) + \mu_1 \|v - x - d_1\|_2^2 + \mu_2 \|y - Ax - s - d_2\|_2^2)$$

update: $d_1 \leftarrow d_1 - (v_{est} - x_{est})$ update: $d_2 \leftarrow d_2 - (y - Ax_{est} - s_{est})$ where $\mu_1$ and $\mu_2$ are some positive numbers.
and iteratively solving the reformulated equation for values of $x_{est}$, $v_{est}$, $s_{est}$ to estimate the location of the target.

In some embodiments, solving for values for $x_{est}$, $v_{est}$, and $s_{est}$ further comprises using the following equations:

$$v_{est} =$$

$$\operatorname{soft}(x_{est} + d_1, 1/2\mu_1) = \begin{cases} x_{est} + d_1 - 1/2\mu_1 & \text{if } x_{est} + d_1 - 1/2\mu_1 \geq 0 \\ 0 & \text{if } 1/2\mu_1 > |x_{est} + d_1| \\ x_{est} + d_1 + 1/2\mu_1 & \text{if } x_{est} + d_1 + 1/2\mu_1 \leq 0 \end{cases}$$

$$s_{est} = \begin{cases} y - Ax_{est} - d_2 & \text{if} \|y - Ax_{est} - d_2\|_2 \leq \sigma' \\ \sigma' \frac{y - Ax_{est} - d_2}{\|y - Ax_{est} - d_2\|_2} & \text{if} \|y - Ax_{est} - d_2\|_2 > \sigma' \end{cases}$$

-continued $$x_{est} = (\mu_1 I + \mu_2 A^H A)^{-1} [\mu_2 A^H (y - s_{est} - d_2) + \mu_1 (v_{est} - d_1)],$$

and iteratively solving these equations using the following procedure:

1. choose $\mu_1$ and $\mu_2$ and initialize $x_{est}$, $d_1$ and $d_2$
2. solve $$v_{est} = \operatorname*{argmin}_{v} \|v\|_1 + l_{\sigma'}(s) + \mu_1 \|v - x - d_1\|_2^2$$

$$s_{est} = \operatorname*{argmin}_{s} l_{\sigma'}(s) + \mu_2 \|y - Ax - s - d_2\|_2^2$$

$$x_{est} = \operatorname*{argmin}_{x} \mu_1 \|v_{est} - x - d_1\|_2^2 + \mu_2 \|y - Ax - s_{est} - d_2\|_2^2$$

3. updated: $d_1 \leftarrow d_1 - (v_{est} - x_{est})$
update: $d_2 \leftarrow d_2 - (y - Ax_{est} - s_{est})$
4. and repeat steps 1-3 until locations for each of the one or more targets are estimated.

According to a fourth aspect of the present invention, there is provided a method for estimating a location of a target using a sparse representation framework where at least one interfering transmitter is transmitting an interfering signal. The method comprising receiving energy signals including an energy signal-of-interest, the interfering energy signal and coherent interference, and processing the received energy signals in at least one processor using a sparse representation framework comprising receiving received energy signals and separating the energy signal-of-interest present in each snapshot collection window in one of a spatial domain, a temporal domain and a frequency domain, so that only the energy signal-of-interest and associated coherent interference are present in a snapshot.

For passively estimating the location of the target transmitting the signal of interest, the method further comprises converting the energy signal-of-interest and associated coherent interference present in each snapshot from an energy signal in a time domain to an energy signal in a frequency domain, and dividing the energy signal in the frequency domain in each snapshot with a reference signal which is not equal to 0, arranging a search grid around an area defined an angle θ and a delay τ on the at least 2-D grid, where a frequency domain measurement ratio term for angle θ is represented as follows:

$$r_{n,m} = \frac{\sum_{k=1}^{K} \sum_{l=1}^{L} \alpha_{k,l} e^{-j2\pi f_m (\tau_k - \Delta t_{n,l})}}{\sum_{k=1}^{K} \sum_{l=1}^{L} \alpha_{k,l} e^{-j2\pi f_m (\tau_k - \Delta t_{n0,l})}}$$

calculating all possible values for term $(\tau_k - \Delta t_{n,1})$ based on the search space defined by values of angle θ and values of delay τ, sorts the calculated values for the term $(\tau_k - \Delta t_{n,1})$ from small to large and denotes the sorted calculated values for the term $(\tau_k - \Delta t_{n,1})$ from small to large as follows:

$$\{\epsilon_{n,1}, \epsilon_{n,2}, \ldots \epsilon_{n,V}\}$$

where V=KL and the corresponding amplitudes are denoted as $\{\beta_1, \beta_2, \ldots, \beta_V\}$, which belong to the set of amplitudes α, and the terms corresponding to $(\tau_k - \Delta t_{n0,1})$ are now denoted as $\{\epsilon_{n0,1}, \epsilon_{n0,2}, \ldots, \epsilon_{n0,V}\}$, and are arranged based on the sorting sequence of the calculated values for $(\tau_k - \Delta t_n,$ 1) and are not necessarily in an ascending order, rearranging the spectrum ratio equation using the new notations to obtain the following homogeneous spectrum ratio equation in matrix vector form;

$$\underbrace{\begin{bmatrix} \varphi_{11} & \cdots & \varphi_{V1} \\ \vdots & \ddots & \vdots \\ \varphi_{1M} & \cdots & \varphi_{VM} \end{bmatrix}}_{\varphi} \underbrace{\begin{bmatrix} \beta_1 \\ \vdots \\ \beta_V \end{bmatrix}}_{\beta} = \begin{bmatrix} 0 \\ \vdots \\ 0 \end{bmatrix}$$

and solving for β using the sparsity solver to estimate a location of the interfering transmitter transmitting the interfering signal, where the solution of β is spanned by the null space of φ, a correct β is sparse, and β cannot be zero.

For actively estimating the location of the target, the method further comprises applying spatial nulling to suppress the interfering signal transmitted from the estimated location of the interfering transmitter transmitting the interfering signal, transmitting an energy signal in at least one direction, the energy signal reflecting off of at least the target, detecting the target in an azimuth-elevation-range resolution cell and establishing a three-dimension (3-D) grid covering an area including the azimuth-elevation-range resolution cell containing the one or more targets, and reforming the target location estimation problem into a linear angle-excess range estimation problem for the target represented in the general form:

$Ax=y$ where x is a solution vector, A is a matrix of known functions, and y is a vector from observation. The method further comprises forming a number of measurement equations, the number of measurement equation being equal to N×M, where N is the number of outputs from receiving elements of the sensor array, and M is the number of frequency sampling points available, forming a matrix based on the N×M measurement equations for the solution vector y and a K×L search space in the 3-D grid, forming a 3-D image of the K×L search space, where the solution vector x for the target on the 3-D image is sparse when a number of grid points within the K×L search space is much greater than a number of grid points P having a value above a noise floor of the K×L search space (KL>>P), and solving the matrix for the solution vector x using the sparsity solver to estimate the location of the target.

DETAILED DESCRIPTION OF THE INVENTION

Figure 1:
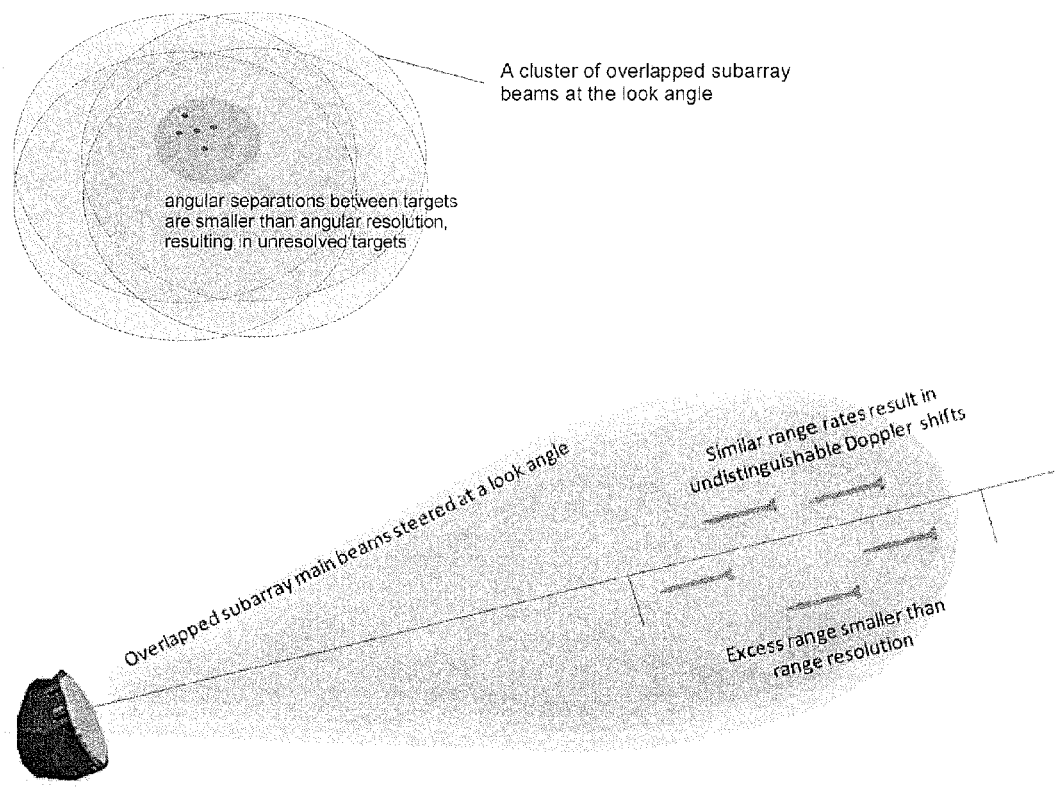
FIG. 1 shows an arrayed-radar with multiple targets in a resolution cell.

The system and method of the present invention uses a sparse representation framework, which hereinafter is referred to as sparsity-based processing, running on one or more computers of a sensor system, to enhance target location estimation capabilities of the sensor system for one or more targets. The sparsity-based processing of the system and method of the present invention even enables enhanced target resolution performance for closely spaced targets in environments rich in multipath interference. Recent breakthroughs in sparsity-based estimation theories, which is a sister discipline to compressive sensing, are employed in the sparsity-based processing of the system and method of present invention to resolve angular and temporal ambiguity in the received signals caused by coherent interference, improve angular resolution accuracy of the received signals, and estimate a location for targets with potentially an order of magnitude improvement in resolution accuracy and performance compared to traditional signal processing techniques used in existing sensor systems, even in environments having coherent interference due to multipath and signal repeaters. The underlying technology of the present invention provides cross-cutting benefits to all active array and passive array sensing applications, as well as improving the resolution of active signal transmitting systems, including radar systems.

Unlike traditional signal processing techniques, the sparsity-based processing of the system and method of the present invention uses snapshots of the received signals and does not require the construction of a signal covariance, used in most traditional target location resolution and adaptive array techniques. In addition, the system and method of the present invention is tolerant to coherent interference (e.g. multipath and signal repeaters), and provides estimated locations for targets in all three dimensions—i.e. range, azimuth, and elevation with higher resolution, even in higher noise environments.

The sparsity-based processing of the system and method of present invention uses snapshot samples of the received signals in an innovative new way to formulate and form a matrix for a target location estimation problem and solve the matrix by applying a sparse representation framework (i.e., sparsity-based processing) to resolve ambiguity in the received signals, improve the angular resolution accuracy (e.g., DoA accuracy) of the received signals, and improve the accuracy and performance of the sensor system for estimating a location of targets, even in environments having high coherent interference due to multipath and signal repeaters. The signal conversion to the frequency domain, frequency-domain division operations, search grid formulation, and angular and temporal ambiguity resolution processing for solving the sparse vector estimation problem are innovative concepts of the present invention. The disclosed unique formulation techniques frame a sensor target location problem into a sparsity estimation problem in which the target location can be solved using sparsity solvers with better resolution, by potentially an order of magnitude, than can be provided by existing sensor location techniques.

The sparsity-based processing of the system and method of the present invention uses target information spanning spatial, temporal, and spectral domains, and constructs an innovative joint sparse DoA and multipath estimation model for resolving ambiguity in the DoA of received signals, including the reflected or echo signal from the targets and associated multipath replicas in signal transmitting sensor system embodiments. This novel modeling technique of the present invention enables the sparsity-based processing to apply sparsity solving techniques to resolve and estimate a location of a target.

General Processing Description

When the sensor system detects one or more targets within a defined area having its boundaries defined in at least the azimuth and elevation dimensions, but is unable to determine the number of targets or the location of each target in the defined area, in a severe coherent interference environment, one embodiment of the system and method of the present invention, sparsity-based processing initially passively resolves signal ambiguity and estimates the location of each signal-of-interest as described in the following paragraphs.

Initially, the processor(s) of the sensor system using sparsity-based processing establishes a 2-D (for linear array) or 3-D grid (for planar array) covering the defined area in which the targets were detected. For passive sensor systems, the 2-D grid spans a single angular space and a multipath space and the 3-D grid spans two orthogonal angular space and a multipath space. For active sensor systems, the 2-D grid spans a single angular space and an excess range space and the 3-D grid spans two orthogonal angular space and an excess range space. In the sparsity-based processing, each target is assumed to occupy a single grid point in the 2-D or 3-D grid, and the 2-D or 3-D grid is considered to be sparse because the number of grid points contained within the 2-D or 3-D grid is assumed to be much greater that the number of targets to be located in the defined area covered by the 2-D or 3-D grid.

This embodiment of sparsity-based processing then takes one or more snapshots of the received signals in a snapshot collection window, converts these received signals in the time domain to received signals in the frequency domain, and normalize the frequency-domain signal with a frequency-domain reference signal. This unique frequency-domain snapshot processing approach re-casts the original target estimation problem into a linear estimation problem in which the map image represented by a solution vector is sparse in nature. This enables embodiments of the system and method of the present invention to then apply a sparsity solver, employing one or more advanced sparse solution estimation techniques, such as Variable Splitting and Augmented Lagrangian efficient L1-norm minimization solver techniques, to find the sparse solution to the target estimation problem and provide a 3-D image of the detection cell/defined area. The resulting 3-D image provides precise position estimations for each of the targets within the detection cell/defined area.

The system and method of the present invention does not use or rely upon signal covariance based processing or Hankel matrix based processing, which advantageously removes limitations associated with signal covariance based processing and Hankel matrix based processing. The system and method of the present invention significantly improve range resolution and angular resolution performance of the sensor by potentially an order of magnitude. Depending on the signal bandwidth, the sparsity-based processing of the present invention can also be applied to detail 3-D target imaging for classification purposes.

The processing necessary for target position estimation of the present invention may significantly increase the amount of signal processing performed by the sensor system (signal processing bandwidth) to determine the location of the targets. In some sensor systems, this may require hardware upgrades to processing assets, as well as higher power consumption.

Sensor System Passive Estimation of Signal Transmitter Location

In some sensor system embodiments, the sensor system does not actively transmit a signal (e.g., remains passive) and the sparsity-based processing, using only azimuth and elevation data for the received signals, angularly, temporally, or spectrally separates the received signals, provides an coarse estimated direction of arrival for each signal of interest (SOI), and then estimates a finer location for each coarsely separated signal of interest, even when the coarsely separated SOI is coherently interfered.

The passive DoA estimation problem relates to the electronic protection/electronic support (EP/ES) and signal intelligence (SKINT) missions, for example. Some examples of passive system embodiments include an electronic support measures (ESM) system or other arrayed signal receiving sensor system, such as towed-array sonars and cell phone location capabilities using cellular system cell tower transceivers.

For example, an arrayed-sensor system initially receives signals transmitted by one or more signal transmitters at multiple receiving elements of the arrayed sensor system, and the present invention can passively resolve and estimate the location of each of signal transmitter (i.e., target) using only the existing arrayed receiving elements of the sensor system by enforcing sparsity constraints in the sparsity-based processing. The system and method of the present invention initially parses the received signals by taking snapshots of the received signals in snapshot collection windows, for example. The frequency of the snapshots and duration of the snapshot collection windows are variables selected by the sparsity-based processing based on the signal environment encountered. Since the received signal at each receiving element has an unknown waveform and may include coherent interference, the sparsity-based processing converts each received signal in a snapshot from a received signal in the time domain to a received signal in the frequency domain. The converted received signals in the frequency domain are then normalized by dividing the received signal at each receiving element in the snapshot with a reference signal. The reference signal is the received signal of one of the elements of the sensor system array.

However, since the reference signal and each of the received signals may contain coherent interference due to multipath and/or repeated signals, thereby causing angular and temporal ambiguity in these signals, the present invention now applies sparsity-based processing to the converted, normalized received signals in the frequency domain to resolve any ambiguity and separate the signal of interest from coherent interference.

The combination of received signal conversion to the frequency domain, normalization, and sparsity formulation resolves the signal of interest, which travels from the target to the receiver via a direct line-of-sight (LOS) path, from multipath reflected signals and other signal repeaters present in the environment. The system and method of the present invention reformulates the target location estimation problem and provide an estimate of each signal transmitter (target) location by enforcing sparsity constraints, thereby enabling the benefits associated with enforcing the sparsity constraints to be realized. The reformulation of the target location estimation problem is discussed in detail in the arrayed-radar example.

Active Signal Transmission Sensor Systems

In some embodiments, the sensor system actively transmits one or more signals and resolves the position of each target, even where the targets are closely spaced targets, in all three dimensions (i.e., range, azimuth and elevation) in high noise/signal interference environments. This is achieved by first locating the interfering signals using the passive sparsity-based processing, then apply spatial nulling, to suppress the interferences, and then detect targets by applying, the active sparsity-based processing. The active DoA estimation problem relates to radar target location missions, for example. Examples of active signal transmission sensor systems include an arrayed radar system having a linear, planar, phased or 3-D array, and sonar systems.

In some of these embodiments, the sensor system is a radar system, and the sparsity-based processing of the present invention enables the radar system to estimate a location for each target when multiple targets are in a single resolution cell of the radar system, even in the presence of large number of interfering signals, including jamming signals, and associated multipath signals, and repeated jamming signals, and associated multipath signals. This is achieved by first locating the interfering signals using the passive sparsity-based processing, then apply spatial nulling to suppress the interferences, and then detect targets by applying the active sparsity-based processing. In radar system applications, the sparsity-based processing improves the angle and range estimation accuracy and enhances the radar target location capabilities of the radar system.

The new sparse representation framework (sparsity-based processing) of the present invention achieves higher target resolution and accuracy in the coherent interference environment using same radar front-end resources, and solves the radar target localization problem. In addition, the sparse representation framework is further extended to solve the wide-band signal transmitter, including signal jammers, localization problem, thereby, improving the electronic support/protection capabilities of radars. The sparse representation framework requires only snapshots of the received signals, does not use signal covariance, operates on fewer spatial degrees of freedom, and requires lower signal-to-noise power ratio compared to conventional approaches.

Examples of Radar System Applications

Figure 2:
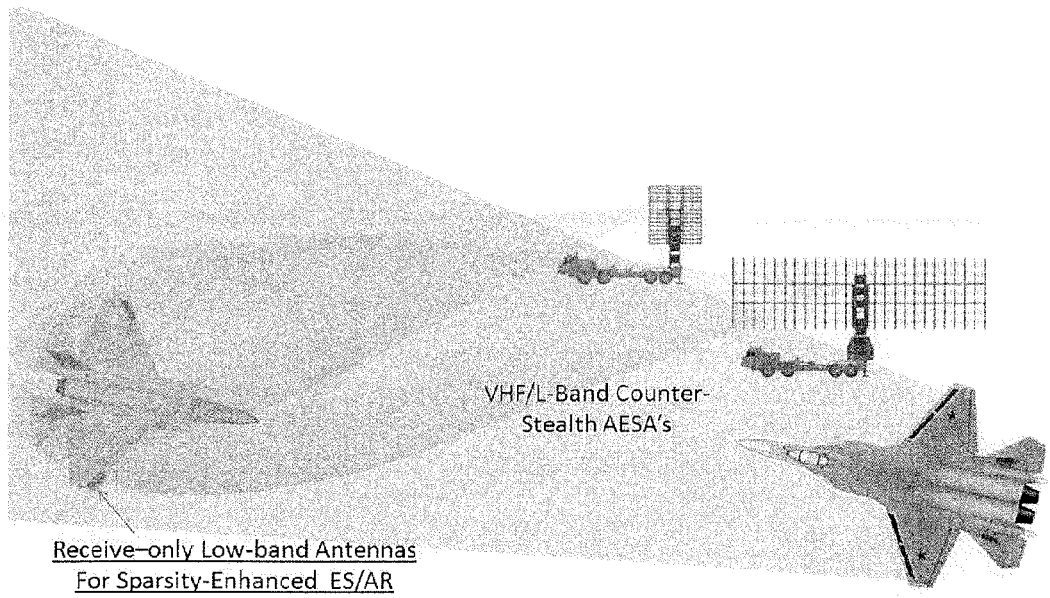
FIG. 2 illustrates an example of sparsity-based processing for counter-stealth L-Band radar and EW applications.

In some embodiments, the sparsity-based processing system and method of the present invention are applied to radar systems. For example, an L-Band active electronically scanned array (AESA) radar can be used for acquiring stealth aircraft, as shown in FIG. 2, but this radar has limited resolution and accuracy so it is not good for targeting the detected aircraft. By applying the sparsity-based signal processing of the present invention to counter-stealth L-band radar and electronic warfare applications, the targeting/weapon guidance of a non-friendly L-band AESA could be enhanced to pose an elevated threat to friendly very low observable (VLO) airframes. By applying the sparsity-based processing to a friendly Anti Radiation (AR) capability, the AR capability can be improved to provide an enhanced counter-counter stealth capability.

Figure 3:
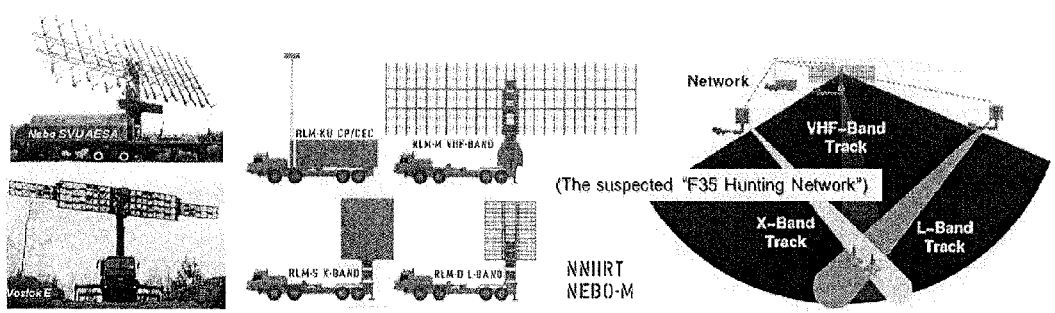
FIG. 3 illustrates an example of sparsity-based processing for land based counter VLO radar applications.

Applying sparsity-based processing of the present invention to a land-based Low-band (VHF & L-Band) counter-stealth radar, such as shown in FIG. 3, could improve the resolution and accuracy of the radar, such that with decent elevation performance, the resolution improves from 2-D to 3-D, while also making the radar system smaller and more mobile, thereby making it more difficult to counter. Sparsity based processing of the present invention can also be applied to multi-static radar networks to improve time resolution and accuracy in multipath environments.

Figure 4:
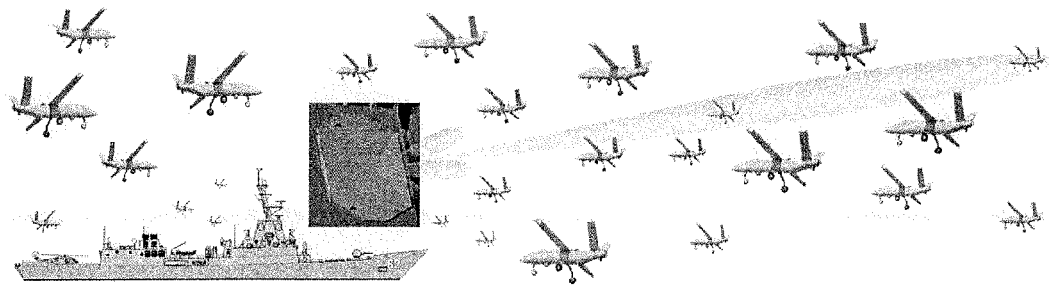
FIG. 4 illustrates an example of an embodiment of the sparsity-based processing of the present invention applied to radar electronic counter-counter measure (ECCM) processing applications.

For example, in an environment containing targets of interest to be tracked, multiple signal transmitters transmitting wide-band transient signals that are positioned relatively close to the arrayed-radar, such as unmanned aircraft systems (UAV), as illustrated in FIG. 4, as well as multipath and background clutter, the density of transmitted signals present would interfere with the target detection capability of the arrayed-radar and prevent the target location capability of the arrayed-radar from performing the target location function. In this example, the number of signal transmitters (including signal jammers, if present) is much greater ($\gg$) than the number of array elements dedicated for adaptive digital beam forming, so the transmitted signals present in the environment would overwhelm the adaptive digital beam forming capability of the arrayed-radar, causing the arrayed-radar to fail to adaptively null out these signals (including jamming signals, if present) and fail to locate the signal transmitters (including signal jammers, if present). However, applying the sparsity-based processing of the present invention to the radar electronic counter-counter measure (ECCM) application of the arrayed-radar would enable the arrayed-radar to resolve ambiguities in the received signals, improve DoA data for the received signals, and estimate the locations of targets and the signal transmitters transmitting known and unknown signal waveforms. The system and method of the present invention can enable the arrayed radar to provide estimated locations of targets even when intentional signal jamming is present.

In some embodiments, the sparsity-based processing of the present invention is implemented as a radar system back-end upgrade to improve the performance of legacy radar systems by replacing the back-end signal processing capability to include the state-of-the-art sparsity-based processing capabilities of the present invention. In these embodiments, simply replacing the signal processor to include sparsity-based processing of the present invention enables existing system hardware to meet new requirements and/or new mission modes.

In other embodiments, the sparsity-based processing of the present invention is implemented as a radar detection capability enhancement for improving lower-band (e.g. L-band, S-band) radar resolution and to provide a preliminary target discrimination capability that is currently only available in higher-frequency radar systems (e.g. X-band) and higher bandwidth signals.

In other embodiments, the sparsity-based processing of the present invention enhances the electronic protection/support capability of existing sensor system by providing more accurate identification and location of signal sources, including jamming and interference sources, using fewer dedicated system resources than required using more traditional techniques. The new sparsity-based processing will enable existing radar systems to meet new EP/ES requirements without modifying the front-end architecture of the sensor system.

In some radar system embodiments, the sparsity-based processing of the radar system can not only be applied for detecting and locating closely spaced or clustered targets, but can also be applied for detecting counter-stealth radars, and detecting stealth aircraft via a multi-static radar network.

In other embodiments, the sparsity-based processing of the present invention is used with sensors having smaller sensor arrays to provide target location performance equal to sensor system having much larger sensor arrays.

In some radar system embodiments, depending on the signal bandwidth, the sparsity-based processing of the present invention can be applied to more precisely detail the 3-D target imaging for classification purposes, with resolution high enough to resolve individual structural parts of the target.

While the sparsity-based processing of the present invention does not require changes to the physical specifications of the receiving and transmitting elements of an arrayed-radar, the processing capabilities may require a significant increase in signal processing bandwidth, potentially requiring more powerful hardware processing assets and higher power consumptions.

In some radar system embodiments, the sparsity-based processing can be used to reduce the physical size of existing radars while maintaining the original performance specifications. Below is a summary of the key features of the sparsity-based processing system and method of the present invention:

Non covariance based processing;
No loss of effective aperture (no spatial smoothing, no Hankel matrix);
Improved emitter localization capability in rich coherent inference environment; and
Improved 3-D resolution (angular and range dimensions).

An example of the system and method of the present invention for enhancing the target resolution performance of an arrayed radar system in a high noise/signal interference/signal jamming environment will be discussed in the following section.

Arrayed-Radar System in a Coherent Interference Environment Example

In the arrayed radar system example, multiple targets of interest are present in a single radar resolution cell, as shown in FIG. 1, in an environment including a plurality of signals and associated coherent interference, and the arrayed-radar is unable to determine the number of target or determine a location for each of the targets present in the resolution cell. The process starts with first locating the interfering signals using the passive sparsity-based processing, then apply spatial nulling to suppress the interferences, and then locate targets with higher resolution by applying the active sparsity-based processing.

Passive Estimation of Signal Transmitter Location Using Sparsity-Based Processing In this example, the arrayed-radar initially employs sparsity-based processing and enforces sparsity constraints to passively resolve and estimate the location of each of the signal of interest (and signal jammers, if present) using the existing radar sub-arrays and auxiliary elements based on snapshots of the received transmitted signals (and jamming signals, if present) taken in defined snapshot collection windows and the known radar waveform transmitted by the radar system. In this example, whether the transmitted signals have a known or unknown signal waveform is not determinative to solving and estimating the location of the signal transmitters (and signal jammers, if present). A preprocessing is performed to separate signals of interest in spatial domain (such as using beam forming to separate signals coming from difference angles), temporal domain (for separating transient signals offset in time, typical to wideband pulsed signals), and frequency domain (for separating signals offset in frequency or differing in Doppler shifts) such that in each of the resulting separated signal, at most one signal of interest and associated coherent interferences may be present.

In the example, the number of radar sub-arrays and auxiliary elements do not need to be greater than the number of signal transmitters (and signal jammers, if present) encountered, and a tap-delay space-time covariance is not necessary to de-correlate known or unknown signal waveforms (and jamming signals, if present) from multipath, background clutter or, even a concerted electronic counter measure (ECM) attack (i.e. signal repeaters).

Since unknown signals (and jamming signals, if present) have unknown waveforms, embodiments of the system and method of the present invention convert the received signals in the time domain to received signals in the frequency domain, then normalize the received signals in the frequency domain by dividing each received signal in the snapshot by a reference signal. The reference signal can be a received signal at one of the receiving elements in the array. However, since the received signals and the reference signal, when a received signal is used as the reference signal, may contain coherent interference including multipath, the normalized received signals in the frequency domain may include ambiguity in the angular and temporal space.

In this radar system example, after estimating the location of the target (signal transmitters transmitting the signals-of-interest) (and location of signal jammers, if present), the next step is for the radar system to suppress the interfering signals transmitted from the estimated locations. Then, the radar system using the sparsity-based processing estimates the location of any targets of interest after the removal of interfering signals. An example of the sparsity-based processing for resolving and estimating the location of targets of interest is discussed in more detail in the next section of the specification Active Estimation of a Target Location Using Sparsity-Based Processing:

In the example of the arrayed-radar system detecting multiple targets within one range-angular-Doppler detection resolution cell shown in FIG. 1, when the arrayed-radar system is unable to resolve the number of targets or location of each target in the detection resolution cell, the sparsity-based processing of the present invention establishes a fine 3-D grid covering the detection resolution cell containing the detected targets. In the example, the 3-D grid established by the present invention in this radar example has a sufficiently small grid resolution to separate and locate each of the targets within the single resolution cell.

Locating a Radar Target Using Sparsity-Based Processing:

Establishing a fine 3-D grid to cover the range-angular-Doppler detection cell where the suspected targets of interest were detected, provides a 3-D fine azimuth-elevation-excess range map (hereinafter 3-D map image) of the detection cell. The resulting 3-D map image provides a grid with resolution small enough to separate each of the targets from other targets because in the 3-D map image, each target is assumed to occupy a single grid point, and the 3-D map image is considered sparse because there are many more grid points present in the 3-D map image than the number of targets to be separated.

The sparsity-based processing then uses a unique frequency-domain snapshot processing approach that re-casts the original target DoA estimation problem into a linear angle-excess range estimation problem in which a solution vector represented on the 3-D map image is sparse. In some embodiments of the present invention, the sparsity-based processing then applies a sparsity solver employing advanced sparse solution estimation techniques for finding the sparse solution precisely. In one embodiment, the sparsity solver uses a combination of L1-norm minimization, a variable splitting technique and an augmented Lagrangian technique to efficiently form a 3-D map image and solve for the location of the targets of interest. The resulting 3-D map image reveals the refined angular and range positions of the targets of interest within the detection cell. In some embodiments, the 3-D image of the K×L search space for each of the one or more estimated target vectors is formed relative to the earliest arriving received energy signal for that target using the azimuth angle, elevation angle and excess delay of each element having the energy level above the predetermined energy threshold level for each of the one or more estimated target vectors.

Figure 5:
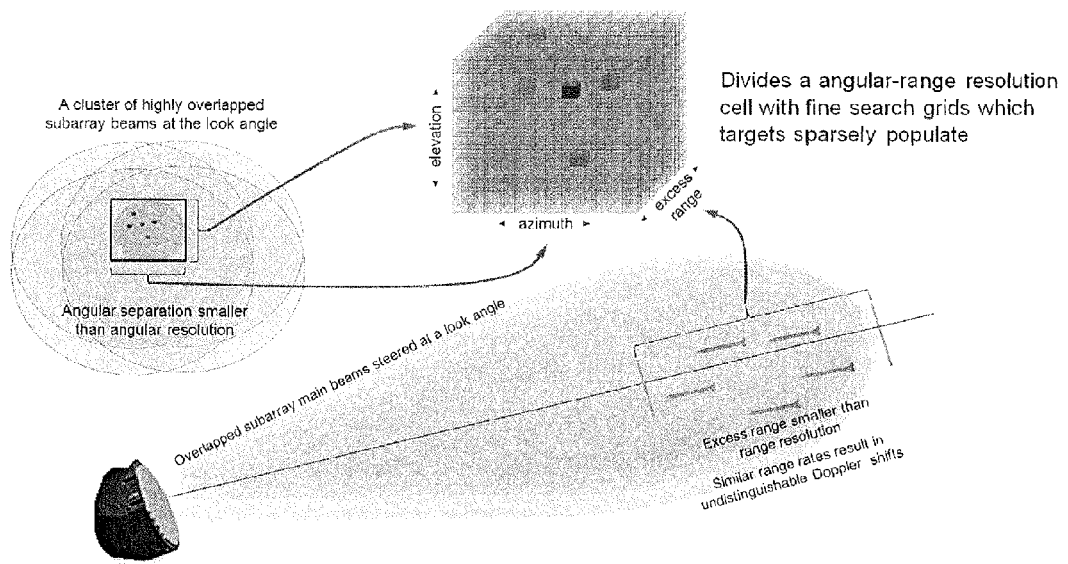
FIG. 5 illustrates an example of a radar 3-D fine grid in excess range—azimuth—elevation space used in one embodiment of the sparsity-based processing of the present invention.

Sparse Solution:

Based on sparse solution estimation/compressive sensing theory, a significant improvement in target location is achievable when the number of spatial-spectral measurements exceeds the number of targets to be resolved. An example of a 3-D map image used in the sparsity-based processing of the present invention is shown in FIG. 5. The sparsity-based processing frames the target position estimation problem in a new and novel way to provide a target location estimation problem in a form that can be resolved to determine target location as follows:

$$Ax = y \quad (1)$$

where:
  x is the sparse solution vector,
  A is a matrix of known functions, and
  y is a vector from observation.

In equation (1), the sparse solution vector x is the size of the 3-D map image, and the number of rows of A (and the length of the y vector) must be greater than the number of detectable targets when the sparsity constraints are enforced. However, the number of rows of A (and the length of the y vector) do not need to be equal or greater than the size of the sparse solution vector x, only greater than the number of detectable targets when the sparsity constraints are enforced. The solution is then determined via $x_{est} = \arg\min_x |x|_1$ where the quadratic constraint $\|Ax - y\|_2^2 < \epsilon$ must be met.

Figure 6:
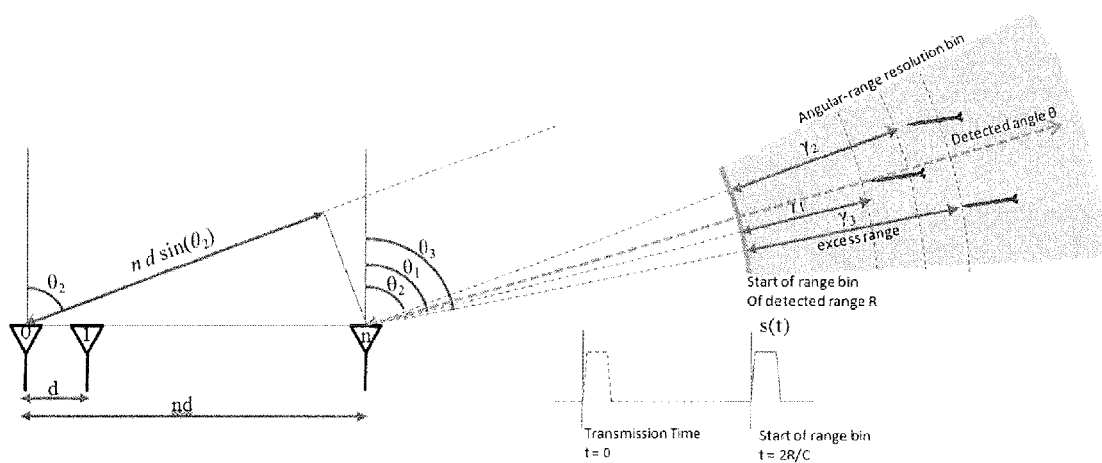
FIG. 6 shows an example of an uniform linear array (ULA) formulation.

Example Problem Setup and Notations of Sparsity-Based Processing for Estimating Target Location Using a Uniform Linear Arrayed Radar An example of the problem set up and notations used in one embodiment of sparsity-based processing for estimating the location of a target using a uniform linear array radar are shown in FIG. 6 and described in more detail in the following paragraphs. First, the received reflected signal from the i-th target received by the n-th element (or sub-array) is represented by the following equation:

$$s_{n,i}(t) = \alpha_i s\left(t - \frac{2\gamma_i}{C} + \frac{nd\sin\theta_i}{C}\right) = \alpha_i s(t - \tau_i + \Delta t_{n,i}) \quad (1)$$

where:
  $S_{n,i}(t)$ is the received reflected signal from the i-th target received at the n-th receiving element;
  $\alpha_i$ is the amplitude of the received signal from $i^{th}$ target at arrival angle $\theta_i$;
  s is transmitted radar signal frequency;
  t is time;
  $\gamma_i$ is excess range to $i^{th}$ target;
  C is the speed of light;
  $\tau_i$ is describes delayed and attenuated components of received signal, and
  $\Delta t_{n,i}$ is time delay of reflected signal from $i^{th}$ target at the n-th receiving element.

The output signal by the n-th element (or sub-array) is represented by the following equation:

$$s_n(t) = \sum_{i=1}^{P} \alpha_i s(t - \tau_i + \Delta t_{n,i}) + w_n(t) \quad (2)$$

where $\tau_i = \frac{2\gamma_i}{C}$; $\Delta t_{n,i} = \frac{nd\sin\theta_i}{C}$ and typically $\tau_i \gg \Delta t_{n,i}$ Here, the form of the received reflected signal, s(t), is dependent on the transmitted radar waveform and any channelization and Doppler filtering applied to the received reflected signal with respect to the detected angular-range-Doppler bin. In addition, pulse compression if applied needs to be considered as well.

The sparsity-based processing of the present invention converts the received signal s(t), which is a received signal in the time domain to a received signal in the frequency domain. In the frequency domain, the received signal at the nth receiving element, $S_n(t)$, is represented by the following equation:

$$S_n(f_{m'}) = S_{n,m'} = \sum_{i=1}^{P} \alpha_i S(f_{m'}) e^{-j2\pi f_{m'}(\tau_i - \Delta t_{n,i})} + W_n(f_{m'}) \quad (3)$$

The received reflected signal in the frequency domain is then divided with the known radar signal in the frequency domain, as shown in the following equation;

$$r_{n,m'} = \frac{S_n(f_{m'})}{S(f_{m'})} = \sum_{i=1}^{P} \alpha_i e^{-j2\pi f_{m'}(\tau_i - \Delta t_{n,i})} + \frac{W_n(f_{m'})}{S(f_{m'})} \quad (4)$$

$$\Rightarrow r_{n,m} =$$

$$\sum_{i=1}^{P} \alpha_i e^{-j2\pi f_m(\tau_i - \Delta t_{n,i})} = \begin{bmatrix} e^{-j2\pi f_m(\tau_1 - \Delta t_{n,1})} & \cdots & e^{-j2\pi f_m(\tau_P - \Delta t_{n,P})} \end{bmatrix} \begin{bmatrix} \alpha_1 \\ \vdots \\ \alpha_P \end{bmatrix}$$

where $m \in \{m'\}$ s.t. $S(f_m) \gg$ noise power
for n=0 ... N−1 and m=1 ... M.

When the number of receiving element outputs from the uniform linear array of the radar is N, and the number of frequency sampling points available are M, the sparsity-based processing forms a total of N×M $r_{n,m}$ measurement equations. In some embodiments the measurement equations are matrix-vector equations represented in a form of an active signal model matrix*target vector=measurement vector, where the active signal model matrix is constructed using an array model of the receiving element of the sensor system and a 3-D search grid covering azimuth, elevation, and excess range dimensions of the resolution cell in which the one or more targets were detected, the target vector is a sparse vector to be estimated, and the measurement vector includes a sampling of the received energy signals in the frequency domain.

Next, the sparsity-based processing sets up a refined search grid around a small area within the 3-D grid, based on available angular and range data. In some embodiments, the angular and range data are a look angle θ, and an associated range R:

$$\theta_l = \theta_1 \ldots \theta_L \quad \theta - \frac{1}{2}d\theta \le \theta_l \le \theta + \frac{1}{2}d\theta \quad d\theta = \text{angular res.}$$

$$\tau_k = \tau_1 \ldots \tau_K \quad \frac{2}{C}R \le \tau_k \le \frac{2}{C}(R+dR) \quad dR = \text{range res.}$$

In some embodiments, the refined search grid is a search space covering an area of dimensions K×L (i.e., K×L search space).

The sparsity-based processing then forms a frequency-domain measurement ratio term for each is written as shown in the following equation:

$$r_{n,m} = \sum_{k=1}^{K}\sum_{l=1}^{L} \alpha_{k,l} e^{-j2\pi f_m(\tau_\lambda - \Delta t_{n,l})} = \qquad (5)$$

$$\begin{bmatrix} e^{-j2\pi f_m(\tau_1 - \Delta t_{n,1})} & \ldots & e^{-j2\pi f_m(\tau_K - \Delta t_{n,L})} \end{bmatrix} \begin{bmatrix} \alpha_{1,1} \\ \vdots \\ \alpha_{k,l} \\ \vdots \\ \alpha_{K,L} \end{bmatrix}_{KL \times 1}$$

The sparsity-based processing then forms the following matrix based on the N×M measurement equations of vector y and the K×L search space:

$$y = \begin{bmatrix} e^{-j2\pi f_1(\tau_1 - \Delta t_{1,1})} & \ldots & e^{-j2\pi f_1(\tau_K - \Delta t_{1,L})} \\ & \vdots & \\ e^{-j2\pi f_m(\tau_1 - \Delta t_{n,1})} & \ldots & e^{-j2\pi f_m(\tau_K - \Delta t_{n,L})} \\ & \vdots & \\ e^{-j2\pi f_M(\tau_1 - \Delta t_{N,1})} & \ldots & e^{-j2\pi f_M(\tau_K - \Delta t_{N,L})} \end{bmatrix}_{MN \times KL} \underbrace{\begin{bmatrix} \alpha_{1,1} \\ \vdots \\ \alpha_{k,l} \\ \vdots \\ \alpha_{K,L} \end{bmatrix}_{KL \times 1}}_{x} \qquad (6)$$

In the above matrix, a sparse solution of x exists when P<<KL where only P elements of the KL elements of x have values above the noise floor. The sparsity-based processing then forms a 3-D target location map image (3-D map image) of the K×L search space with the solution of x. In this example, the sparsity-based processing then uses using a highly efficient sparsity solver employing L-1 norm minimization, variable splitting and augmented Lagrangian techniques to solve for x.

The signal conversion to the frequency domain, frequency-domain division operations, and search grid formulation for solving the sparse vector estimation problem are innovative concepts of the present invention. The disclosed unique formulation techniques frame a radar target location problem into a sparsity estimation problem in which the target location can be solved using known sparsity solvers with better resolution, by potentially an order of magnitude, than can be provided by existing radar location techniques. The example sparsity solver is described in more detail in the next section.

Example of Sparsity Solver Embodiment

In this example, the solution to the problem of solving sparse x given y=Ax, and assuming noisy signal measurements, the sparsity solver uses L-1 norm minimization as described in the following paragraphs.

Given y and A where y=Ax+n, in equation (1), equation (1) can be solved for x, if x is sparse and the elements of n are independent Gaussian random variables with zero mean and same variance σ'. By taking the sparsity of x into consideration, the sparsity solver estimates x using the following equations:

$$x_{est} = \underset{x}{\operatorname{argmin}} \|x\|_1 \text{ such that } \|y - Ax\|_2 \le \sigma' \le \sqrt{N_y}\,\sigma \qquad (7)$$

where: $N_y$ is the dimension of y and σ' is to be numerically determined.

Re-formulates equation (7) above to provide the unconstrained optimization problem shown below:

$$x_{est} = \underset{x}{\operatorname{argmin}}(\|x\|_1 + l_{\sigma'}(y - Ax)) \qquad (8)$$

where: the indicator function 1 is defined as follows:

$$l_{\sigma'}(y - Ax) = \begin{cases} 0 & \text{if } \|y - Ax\|_2 \le \sigma' \\ \infty & \text{if } \|y - Ax\|_2 > \sigma' \end{cases} \qquad (9)$$

This forces the solution of the unconstrained optimization problem to satisfy $$\|y - Hx\|_2 \le \sigma'.$$

The sparsity solver then uses a variable splitting technique to reformulate equation (8) above into a new constrained optimization problem as shown below:

$$\{x_{est}, v_{est}\} = \underset{x,v}{\operatorname{argmin}}(\|v\|_1 + l_{\sigma'}(s)) \qquad (10)$$

subject to $v = x$ and $s = y - Ax$

Then, the sparsity solver applies an Augmented Lagrangian technique to reformulate the constrained optimization problem represented by equation (10) into the following equation:

$$\{x_{est}, v_{est}, s_{est}\} = \qquad (11)$$

$$\underset{x,v,s}{\operatorname{argmin}}(\|v\|_1 + l_{\sigma'}(s) + \mu_1\|v - x - d_1\|_2^2 + \mu_2\|y - Ax - s - d_2\|_2^2)$$

update: $d_1 \leftarrow d_1 - (v_{est} - x_{est})$ update: $d_2 \leftarrow d_2 - (y - Ax_{est} - s_{est})$ where $\mu_1$ and $\mu_2$ are positive numbers.

The sparsity solver then iteratively solves equation (11) using the process shown below:
1. choose $\mu_1$ and $\mu_2$ and initialize $x_{est}$, $d_1$ and $d_2$
2. solve $$v_{est} = \operatorname*{argmin}_{v} \|v\|_1 + l_{\sigma'}(s) + \mu_1 \|v - x - d_1\|_2^2 \quad (12)$$

$$s_{est} = \operatorname*{argmin}_{s} l_{\sigma'}(s) + \mu_2 \|y - Ax - s - d_2\|_2^2$$

$$x_{est} = \operatorname*{argmin}_{x} \mu_1 \|v_{est} - x - d_1\|_2^2 + \mu_2 \|y - Ax - s_{est} - d_2\|_2^2$$

3. update: $d_1 \leftarrow d_1 - (v_{est} - x_{est})$
   updated: $d_2 \leftarrow d_2 - (y - Ax_{est} - s_{est})$
4. and repeat In this iterative solution process, values for $v_{est}$, $s_{est}$, and $x_{est}$ are obtained using equations (13), (14) and (15) shown below:

$$v_{est} = \operatorname{soft}(x_{est} + d_1, 1/2\mu_1) = \quad (13)$$
$$\begin{cases} x_{est} + d_1 - 1/2\mu_1 & \text{if } x_{est} + d_1 - 1/2\mu_1 \geq 0 \\ 0 & \text{if } 1/2\mu_1 > |x_{est} + d_1| \\ x_{est} + d_1 + 1/2\mu_1 & \text{if } x_{est} + d_1 + 1/2\mu_1 \leq 0 \end{cases}$$

$$s_{est} = \begin{cases} y - Ax_{est} - d_2 & \text{if} \|y - Ax_{est} - d_2\|_2 \leq \sigma' \\ \sigma' \dfrac{y - Ax_{est} - d_2}{\|y - Ax_{est} - d_2\|_2} & \text{if} \|y - Ax_{est} - d_2\|_2 > \sigma' \end{cases} \quad (14)$$

$$x_{est} = (\mu_1 I + \mu_2 A^H A)^{-1} [\mu_2 A^H (y - s_{est} - d_2) + \mu_1 (v_{est} - d_1)] \quad (15)$$

The outputs of this iterative solution process are values for $v_{est}$, $s_{est}$, and $x_{est}$, which define the estimated location of the target.

Passive Estimation of a Signal Transmitter Location

For the passive case, the received signal at one receiving element of the sensor system is selected as the reference signal and reference element, respectively. When the received signal has a known waveform, the sparsity-based processing of the system and method present invention uses the known waveform of the transmitted signal as the reference signal.

In the passive arrayed-sensor system, the number of signal transmitters in the environment can be greater that the number of receiving elements of the arrayed-sensor system, and a tap-delay space-time covariance is not necessary to de-correlate known and unknown signal waveforms from multipath, background clutter or, even a concerted electronic counter measure (ECM) attack.

In an environment including signal transmitters transmitting both unknown and known waveforms (and signal jammers transmitting jamming signals, if present), a pre-processing is performed to separate signals of interest in spatial domain (such as using beam forming to separate signals coining from difference angles), temporal domain (for separating transient signals offset in time, typical to wideband pulsed signals), and frequency domain (for separating signals offset in frequency or differing in Doppler shills) such that in each of the resulting separated signal, at most one signal of interest and associated coherent interferences may be present. The sparsity-based processing then enforces sparsity constraints to estimate a location for each signal transmitter (and signal jammer, if present). This methodology can be used by both passive receive only systems, such as ESM, and active transmission capable systems, such as a radar that is not transmitting and is operating in a receive-only mode (i.e., passive mode) for estimating the locations of the actively transmitting signal sources, including signal jammers and associated multipath signal arrivals. The passive DoA estimation problem relates to the EP/ES and SIGINT missions, for example.

The sparsity-based processing normalizes the received signal by dividing the received signal by a signal, referred to as a reference signal. The reference signal is used in the denominator for the frequency-domain division operations. In one embodiment, the reference signal used is an output signal from one receiving element or a sub-array of the arrayed-radar. The frequency-domain division operations are then similar to the frequency-domain division operations for the known transmitted signal case discussed in a previous section.

The passive estimation of the direction of a signal of interest (SOI) is an extension of the first innovative concept of the present invention. For example, assuming that only one signal have an unknown waveform is transmitted by one transmitting signal source (or only one jamming signal is transmitted by a single signal jammer) and only the transmitted signal and its associated multipath are received in the signal snapshot collection window, the direction of the transmitting signal source (or signal jammer) and its multipath is estimated using the following process. The processing for this example direction estimation of the signal of interest (SOI) is discussed in more detail in the following section.

If the signal of interest (SOI), is represented by s(t), such as an unknown jammer signal, and its multipath reflection sources are far from the arrayed-radar receiver, the sparsity-based processing views the SOT and its multipath as a plane wave. In this example, the received signals by the n-th element of a uniform linear array (ULA) of the radar is modeled as:

$$s_n(t) = \sum_{i=1}^{P} \alpha_i s(t - \tau_i + \Delta t_{n,i}) + w_n(t) \quad (16)$$

$$\text{where}: \Delta t_{n,i} = \frac{nd\sin\theta_i}{C}$$

$s_n(t)$ is the signal of interest received at the n-th element;
n is the number of receiving elements;
d is the spacing of receiving elements;
$\theta_i$ is the arrival angle of the signal, where i=indicates the SOI and where I>1 indicates a multipath signal;
C is the speed of light, and
$\alpha_i$ is the amplitude of the $\theta_i$ path.

In the frequency domain, the SOI received at the n-th element is represented by the following equation:

$$S_n(f_m) = S_{n,m} = \sum_{i=1}^{P} \alpha_i S(f_m) e^{-j2\pi f_m (\tau_i - \Delta t_{n,i})} + W_n(f_m) \quad (17)$$

Now, the sparsity-based processing selects one of the receiving elements of the array, for this example receiving element n0, as the reference element, and its frequency domain signal is represented by the following equation:

$$s_{n0}(f_m) \quad (18)$$

The frequency domain representation of the signal received at the n-th element shown in (17) is then divided by the reference signal shown in (18), with the constraint that (n≠n0) as shown in the following equation:

$$r_{n,m} = \frac{S_n(f_m)}{S_{n0}(f_m)} = \frac{\sum_{i=1}^{P} \alpha_i e^{-j2\pi f_m(\tau_i - \Delta t_{n,i})}}{\sum_{i=1}^{P} \alpha_i e^{-j2\pi f_m(\tau_i - \Delta t_{0,i})}} \quad (19)$$

Now, the sparsity-based processing sets up a smaller search grid around an angular measurement and a signal delay measurement determined for the received signal-of-interest. In this embodiment, the search grid is set up for angle $\theta$ and delay $\tau$:

$\theta_l = \theta_1 \ldots \theta_L$
$\tau_k = \tau_1 \ldots \tau_K$

The sparsity-based processing forms frequency-domain measurement ratio equations for the received signals in the frequency domain around angle $\theta$ and delay $\tau$, the frequency-domain measurement ratio equations is written in the following form:

$$r_{n,m} = \frac{\sum_{k=1}^{K}\sum_{l=1}^{L} \alpha_{k,l} e^{-j2\pi f_m(\tau_k - \Delta t_{n,i})}}{\sum_{k=1}^{K}\sum_{l=1}^{L} \alpha_{k,l} e^{-j2\pi f_m(\tau_k - \Delta t_{n0,i})}} \quad (20)$$

where:
$r_{n,m}$ is the spectrum ratio;
$\theta_l$ is the angle of the search space;
$\tau_k$ is the signal delay; and
$\Delta t_{n,1}$ is the time of received signal at n-th receiving element.

Based on the search space defined by angle $\theta_l$ values and delay $\tau_k$ values, the sparsity-based processing then calculates all of the possible values for the equation term $(\tau_k-\Delta t_{n,1})$, and sorts the calculated values for the equation term $(\tau_k-\Delta t_{n,1})$ in an ascending order from small to large. This also sorts the corresponding amplitude values $\alpha$ from low to high. The calculated values for $(\tau_k-\Delta t_{n,1})$ are then denoted as shown below:

$$\{\epsilon_{n,1}, \epsilon_{n,2}, \ldots, \epsilon_{n,V}\} \quad (21)$$

where:
V=KL and the corresponding amplitudes are denoted as $\{\beta_1, \beta_2, \ldots, \beta_V\}$, which belong to the set of amplitudes $\alpha$, and the terms corresponding to $(\tau_k-\Delta t_{n0,1})$ are denoted as $\{\epsilon_{n0,1}, \epsilon_{n0,2}, \ldots \epsilon_{n0,V}\}$, which are arranged based on the sorting sequence of the calculated values for $(\tau_k-\Delta t_{n,1})$ and are not necessarily in an ascending order.

Using the above notations, the sparsity-based processing re-arranges the spectrum ratio as shown in the following equation:

$$r_{n,m} = \frac{\beta_1 e^{-j2\pi f_m \epsilon_{n,1}} + \beta_2 e^{-j2\pi f_m \epsilon_{n,2}} + \ldots + \beta_V e^{-j2\pi f_m \epsilon_{n,V}}}{\beta_1 e^{-j2\pi f_m \epsilon_{n0,1}} + \beta_2 e^{-j2\pi f_m \epsilon_{n0,2}} + \ldots + \beta_V e^{-j2\pi f_m \epsilon_{n0,V}}} = \quad (22)$$

$$\frac{\beta_1 Z_m^{-\epsilon_{n,1}} + \beta_2 Z_m^{-\epsilon_{n,2}} + \ldots + \beta_V Z_m^{-\epsilon_{n,V}}}{\beta_1 Z_m^{-\epsilon_{n0,1}} + \beta_2 Z_m^{-\epsilon_{n0,2}} + \ldots + \beta_V Z_m^{-\epsilon_{n0,V}}}$$

where $Z = e^{j2\pi f_m}$

The sparsity-based processing then rearranges the above spectrum ratio equation (22) to obtain the following homogeneous equation:

$$\beta^1 \phi_{1m} + \beta_2 \phi_{2m} + \ldots + \beta_V \phi_{Vm} = 0 \text{ where } \phi_{im} = (r_{n,m} Z_m^{-\epsilon_{n0,1}} - Z_m^{-\epsilon_{n,i}}) \quad (23)$$

In the sparsity-based processing, the homogenous spectrum ratio equation (22) is represented in matrix-vector form as:

$$\underbrace{\begin{bmatrix} \varphi_{11} & \cdots & \varphi_{V1} \\ \vdots & \ddots & \vdots \\ \varphi_{1M} & \cdots & \varphi_{VM} \end{bmatrix}}_{\varphi} \underbrace{\begin{bmatrix} \beta_1 \\ \vdots \\ \beta_V \end{bmatrix}}_{\beta} = \begin{bmatrix} 0 \\ \vdots \\ 0 \end{bmatrix} \quad (24)$$

In this example, the sparsity-based processing then solves for $\beta$, where the solution of $\beta$ is spanned by the null space of $\phi$, and the correct solution is a sparse $\beta$ that is also non-trivial (not all zeros).

However, because finding the non-trivial solution of $\beta$ is not a trivial task, in this example the sparsity-based processing then re-factors the problem by dividing the homogenous equation (22) by one of the values of $\beta$, $\beta_U$, that is not zero, which results in the following equation:

$$\frac{\beta_1}{\beta_U}\varphi_{1m} + \frac{\beta_2}{\beta_U}\varphi_{2m} + \ldots + \frac{\beta_V}{\beta_U}\varphi_{Vm} = -\varphi_{Um} \quad (25)$$

and then solves equation (25) for each $\rho_i$, which is formed as a ratio of a member of $\beta$ (excluding $\beta_U$) and $\beta_U$, as shown below:

$$\underbrace{\begin{bmatrix} \varphi_{11} & \cdots & \varphi_{V-1,1} \\ \vdots & \ddots & \vdots \\ \varphi_{1M} & \cdots & \varphi_{V-1,M} \end{bmatrix}}_{\varphi} \underbrace{\begin{bmatrix} \rho_1 \\ \vdots \\ \rho_{V-1} \end{bmatrix}}_{\rho} = \begin{bmatrix} -\varphi_{U1} \\ \vdots \\ -\varphi_{UM} \end{bmatrix} \quad (26)$$

where
$\rho_i = \beta_{i1}/\beta_U$ and $i \neq U$
$\phi_{jm} \in \{\phi_{im}\text{'s}, i \neq U\}$ Since $\rho$ is sparse and equation (26) is no longer homogeneous, the solution of $\rho$ can be found using standard sparse estimation approaches, which are known in the art and will not be covered in detail here.

Note that non-zero $\beta_U$ values can be identified by examining the $\phi$ matrix in its reduced row echelon form. The row having the most non-zero elements most likely corresponds with a non-zero $\beta$. For example, if the A's row of the reduced row echelon form matrix $\phi$ has the most non-zero elements, let U=A.

Once $\rho$ is solved by the sparsity-based processing with the sparsity constraint enforced, the arrival angle and delay of the SOI will correspond to the $\rho$ having a significant value with the smallest delay in this example. This process of identifying the LOS component from ambiguous multipath components is an inventive concept of the present invention.

Figure 7:
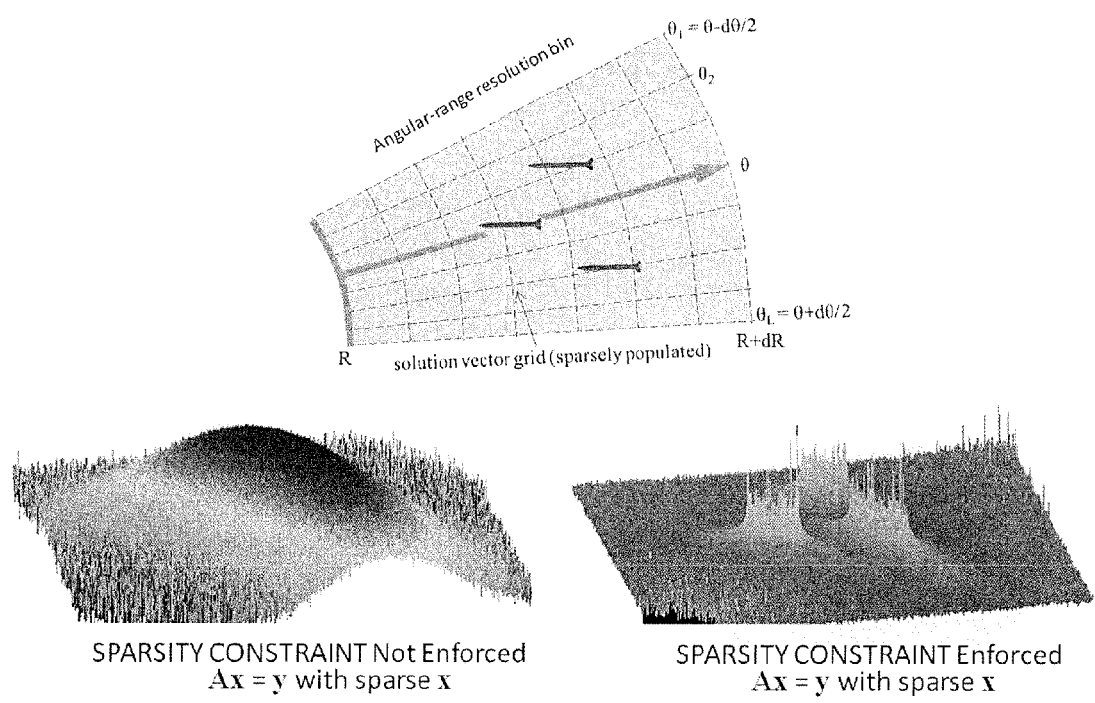
FIG. 7 shows a comparative notational example of sparsity-based processing radar results on the right and conventional radar results on the left.

An example is shown in FIG. 7 of notional radar results using the sparsity-based processing of the present invention (on the right side) and conventional radar results (on the left side) for comparison.

While the example calculations used a uniform array, the formulation of the problem and solution can be easily expanded to apply to a planar array or a 3D array. Further, the sparsity-based processing problem formulation and solution is also applicable to arrayed-sensors in which the array elements are arbitrary not uniform.

While the present invention has been particularly shown and described with reference to the preferred mode as illustrated in the drawings, it will be understood by one skilled in the art that various changes in detail may be effected therein without departing from the spirit and scope of the invention as defined by the claims.

What is claimed:

1. A sensor system for estimating a location of a target using a sparse representation framework comprising:
   a plurality of receiving elements for receiving energy signals including an energy signal-of-interest, other transmitted energy signals and coherent interference; and
   at least one receiver comprising at least one processor using the sparse representation framework for processing the received energy signals and using a sparsity solver for estimating the location of the target,
   wherein the at least one processor using a sparse representation framework is configured to:
      receive received energy signals and separate the energy signal-of-interest present in a signal collection window of a plurality of signal collection windows in at least one of a spatial domain, a temporal domain and a frequency domain, so that only the energy signal-of-interest and associated coherent interference are present in the signal collection window, wherein the energy signal-of-interest is a single signal-of-interest transmitted by the target and includes associated coherent interference;
      convert the energy signal-of-interest and associated coherent interference present in each signal collection window from an energy signal in a time domain to an energy signal in a frequency domain;
      divide the energy signal in the frequency domain in each signal collection window with a reference signal which is not equal to 0;
      arrange a search grid around an area defined by an angle θ and a delay τ on an at least 2-D grid where a frequency domain measurement ratio term for angle θ is represented as follows:

$$r_{n,m} = \frac{\sum_{k=1}^{K} \sum_{l=1}^{L} \alpha_{k,l} e^{-j2\pi f_m (\tau_k - \Delta t_{n,l})}}{\sum_{k=1}^{K} \sum_{l=1}^{L} \alpha_{k,l} e^{-j2\pi f_m (\tau_k - \Delta t_{n0,l})}}$$

where:
   $r_{n,m}$ is the spectrum ratio measurement corresponding to the n-th element and the m-th frequency, $f_m$;
   k=1 . . . K is the search indices corresponding to the delay search grid $\tau_k = \tau_1 \ldots \tau_K$;
   l=1 . . . L is the search indices corresponding to the angle search grid $\theta_k = \theta_1 \ldots \theta_K$;

$\alpha_{k,l}$ is the unknown amplitude to be solved corresponding to the k-th delay search point and the l-th angle search point;
$\Delta t_{n,i} = (nd \sin \theta_i)/C$ is the relative delay of the signal received at the n-th element corresponding to the l-th angle search point;
$\Delta t_{n0,i} = (n0d \sin \theta_i)/C$ is the relative delay of the signal received at the reference element corresponding to the l-th angle on the angle search grid;
d is the spacing between elements;
C is the speed of light; and
j represents the square root of −1;
form matrix vector equations using a signal model matrix;
calculate all possible values for term $(\tau_k - \Delta t_{n,1})$ based on the search space defined by values of angle θ and values of delay τ, sort the calculated values for the term $(\tau_k - \Delta t_{n,1})$ from small to large and denote the sorted calculated values for the term $(\tau_k - \Delta t_{n,1})$ from small to large as follows:

$\{\epsilon_{n,1}, \epsilon_{n,2} \ldots \epsilon_{n,V}\}$ where: V=KL and the corresponding amplitudes are denoted as
$\{\beta_1, \beta_2, \ldots, \beta_V\}$, which belong to the set of amplitudes α, and
the terms corresponding to $(\tau_k - \Delta t_{n0,1})$ are now denoted as $\{\epsilon_{n0,1}, \epsilon_{n0,2}, \ldots \epsilon n_{0,V}\}$, and are arranged based on the sorting sequence of the calculated values for $(\tau_k - \Delta t_{n,1})$ and are not necessarily in an ascending order;
rearrange the spectrum ratio equation using the new notations to obtain the following homogeneous spectrum ratio equation in matrix vector form;

$$\underbrace{\begin{bmatrix} \varphi_{11} & \cdots & \varphi_{V1} \\ \vdots & \ddots & \vdots \\ \varphi_{1M} & \cdots & \varphi_{VM} \end{bmatrix}}_{\varphi} \underbrace{\begin{bmatrix} \beta_1 \\ \vdots \\ \beta_V \end{bmatrix}}_{\beta} = \begin{bmatrix} 0 \\ \vdots \\ 0 \end{bmatrix}$$

where:
$\varphi_{im} = (r_{n,m} Z_m^{-\epsilon_{n0,i}} - Z_m^{-\epsilon_{n,i}})$ is the i-th row and m-th column element of φ; and
$Z = e^{j2\pi f_m}$;
apply the sparsity solver configured to solve the matrix vector equations to estimate the location of the target, the at least one processor being configured to passively estimate the location of the target, the sparsity solver being configured to solve for β, and estimate a location of the target transmitting the signal-of-interest where the solution of β is spanned by the null space of φ, a correct β is sparse, and β cannot be zero; and
output the estimated location of the target.

2. The system of claim 1, wherein to solve for β, the sparsity solver is configured to:
select a $\beta_U$ that is not zero and is a member of $\beta_1 \ldots$ to $\beta_V$ and divide the homogeneous spectrum ratio equation with the selected $\beta_U$ as follows:

$$\frac{\beta_1}{\beta_U} \varphi_{1m} + \frac{\beta_2}{\beta_U} \varphi_{2m} + \ldots + \frac{\beta_V}{\beta_U} \varphi_{Vm} = -\varphi_{Um}$$

solve for each $\rho_i$, which is formed as a ratio of a member of β (excluding $\beta_U$) and $\beta_u$, as shown below:

$$\underbrace{\begin{bmatrix} \varphi_{11} & \cdots & \varphi_{V-1,1} \\ \vdots & \ddots & \vdots \\ \varphi_{1M} & \cdots & \varphi_{V-1,M} \end{bmatrix}}_{\varphi} \underbrace{\begin{bmatrix} \rho_1 \\ \vdots \\ \rho_{V-1} \end{bmatrix}}_{\rho} = \begin{bmatrix} -\varphi_{U1} \\ \vdots \\ -\varphi_{UM} \end{bmatrix}$$

where $\rho_i = \beta_{i1}/\beta_U$ and $i \neq U$ $\phi_{jm} \in \{\phi_{im}\text{'s}, i \neq U\}$ and apply the sparsity solver configured to estimate a location of the target transmitting of the signal-of-interest where: $\rho$ is sparse, and an angle of arrival and delay $\tau$ of each signal-of-interest corresponds to the $\rho_i$ above a predetermined threshold with a smallest delay $\tau$.

3. The sensor system of claim 1, wherein the energy signal-of-interest is multiple signals-of-interest having a single waveform and includes associated coherent interference, and to actively estimate a location of the target the sensor system further comprises at least one transmitter for transmitting an energy signal in at least one direction, the energy signal reflecting off of at least the target; and the at least one processor using a sparse representation framework is configured to:

detect the target in an azimuth-elevation-range resolution cell and establish a three-dimension (3-D) grid covering an area including the azimuth-elevation-range resolution cell containing the one or more targets;

reform the target location estimation problem into a linear angle-excess range estimation problem for the target represented in the general form:

$$Ax = y$$

where:

x is a solution vector,

A is a matrix of known functions, and y is a vector from observation;

form a number of measurement equations, the number of measurement equations being equal to N×M, where N is the number of outputs from receiving elements of the sensor array, and M is the number of frequency sampling points available;

form a matrix based on the N×M measurement equations for the solution vector y and a K×L search space in the 3-D grid;

form a 3-D image of the K×L search space, where the solution vector x for the target on the 3-D image is sparse when a number of grid points within the K×L search space is larger than a number of grid points P having a value above a noise floor of the K×L search space (KL>>P); and apply the sparsity solver configured to solve the matrix for the solution vector x to estimate the location of the target.

4. The system of claim 3, wherein the measurement equations are matrix-vector equations represented in a form of:

an active signal model matrix*target vector=measurement vector where: the active signal model matrix is constructed using an array model of the receiving element of the sensor system and a 3-D search grid covering azimuth, elevation, and excess range dimensions of the resolution cell in which the target was detected, the target vector is a sparse vector to be estimated, and the measurement vector includes a sampling of the received energy signals in the frequency domain; and the 3-D image of the K×L search space for the estimated target vector is formed relative to the earliest arriving received energy signal for the target using the azimuth angle, elevation angle and excess delay of each element having the energy level above the predetermined energy threshold level for the estimated target vector.

5. The system of claim 3, wherein an energy signal used for normalizing the received energy signals in the frequency domain in each signal collection window is the energy signal of a known waveform transmitted by the transmitter and the normalized received reflected energy signals in the frequency domain is represented as follows:

$$r_{n,m'} = \frac{S_n(f_{m'})}{S(f_{m'})} = \sum_{i=1}^{P} \alpha_i e^{-j2\pi f_{m'}(\tau_i - \Delta t_{n,i})} + \frac{W_n(f_{m'})}{S(f_{m'})}$$

$$\Rightarrow r_{n,m} =$$

$$\sum_{i=1}^{P} \alpha_i e^{-j2\pi f_m(\tau_i - \Delta t_{n,i})} = \begin{bmatrix} e^{-j2\pi f_m(\tau_1 - \Delta t_{n,1})} & \cdots & e^{-j2\pi f_m(\tau_P - \Delta t_{n,P})} \end{bmatrix} \begin{bmatrix} \alpha_1 \\ \vdots \\ \alpha_P \end{bmatrix}$$

where:

m0 {mN} s.t $S(f_m)$>>noise power for n=0 ... N−1 and m=1 ... M;

$S_n(f_{m'})$ is the spectrum of the received signal by the n-th element at a frequency $f_{m'}$;

$S(f_{m'})$ is the spectrum of the known waveform at a frequency $f_{m'}$;

$\alpha_i$ is the amplitude of the received signal corresponding to the $i^{th}$ arrival angle;

$\tau_i$ is the delay of the received signal corresponding to the $i^{th}$ arrival angle at the first element;

P is the total number of angles at which the signal arrives; and $\Delta t_{n,i} = (nd \sin \theta_i)/C$ is the relative delay of the signal received at the n-th element corresponding to the i-th arrival angle of the signal.

6. The system of claim 5, wherein after forming the N×M matrix-vector equations, the at least one processor is configured to:

arrange a fine search grid around an area defined by an angle and an associated range in the 3-D grid, and the matrix formed based on the N×M measurements of vector y and a K×L search space is a linear angle-excess range estimation matrix in the following form:

$$y = \underbrace{\begin{bmatrix} e^{-j2\pi f_1(\tau_1 - \Delta t_{1,1})} & \cdots & e^{-j2\pi f_1(\tau_K - \Delta t_{1,L})} \\ \vdots & & \vdots \\ e^{-j2\pi f_m(\tau_1 - \Delta t_{n,1})} & \cdots & e^{-j2\pi f_m(\tau_K - \Delta t_{n,L})} \\ \vdots & & \vdots \\ e^{-j2\pi f_M(\tau_1 - \Delta t_{N,1})} & \cdots & e^{-j2\pi f_M(\tau_K - \Delta t_{N,L})} \end{bmatrix}}_{A_{MN \times KL}} \underbrace{\begin{bmatrix} \alpha_{1,1} \\ \vdots \\ \alpha_{k,l} \\ \vdots \\ \alpha_{K,L} \end{bmatrix}}_{x_{KL \times 1}}$$

where:

y is a N*M-long column vector of elements of $r_{n,m}$ where n=1 ... N and m=1 ... M;

$\tau_k$ is a member of the search grid points of the signal delay $\tau_1 \ldots \tau_K$;

$\Delta t_{n,i} = (\text{nd} \sin \theta_l)/C$ is the relative delay of the signal received at the n-th element corresponding to the l-th angle of the angle search grid $\theta_1 \ldots \theta_K$; and $\alpha_{k,l}$ is the unknown amplitude to be solved corresponding to the k-th delay search point and the l-th angle search point;

a sparse solution of x exists when P<<KL where only P elements of the KL elements of x have values above the noise floor;

an estimated location of the target on the 3-D map image of the K×L search space is formed with the solution of x; and the sparsity solver is configured to estimate a location of the target by solving the matrix for the solution vector x, where the following constraints are satisfied:

the solution vector x for the target on the 3-D image is sparse, and a number of grid points within the K×L search space is larger than a number of grid points P having a value above a noise floor of the K×L search space (KL>>P).

7. The system of claim 6, wherein the angle defining the small area is a look angle θ and the range is the associated range R.

8. The system of claim 3 wherein to solve for a sparse solution for vector x, the sparsity solver is configured to:

apply L-1 norm minimization to form an unconstrained optimization problem, when y and A are known for equation y=Ax+n, the solution vector x for the target is sparse, and the elements of n are independent Gaussian random variables with a zero mean and a variance $\sigma^2$ as follows:

$$x_{est} = \underset{x}{\operatorname{argmin}}\, (\|x\|_1 + l_{\sigma'}(y - Ax))$$

where: the indicator function l is defined as follows:

$$\ell_{l'}(y - Ax) = \begin{cases} 0 & \text{if } \|y - Ax\|_2 \le \sigma' \\ \infty & \text{if } \|y - Ax\|_2 > \sigma' \end{cases}$$

where:

$\sigma' \sqrt{N_y} \sigma$; and $N_y$ is the dimension of y;

where: a solution of the unconstrained optimization problem must satisfy $vy-Hx\|\le\sigma'$; and apply a combination of at least two techniques to solve the unconstrained optimization problem to estimate the location of the target.

9. The system of claim 8, wherein the combination of techniques applied by the sparsity solver to solve the unconstrained optimization problem and estimate a location for the target comprises a variable splitting technique and an augmented Lagrangian technique.

10. The system of claim 9, wherein the variable splitting technique reformulates the following unconstrained optimization problem into a constrained optimization problem represented by the following equation:

$$\{x_{est}, v_{est}\} = \underset{x,v}{\operatorname{argmin}}\, (\|v\|_1 + l_{\sigma'}(s)) \text{ subject to } v = x \text{ and } s = y - Ax$$

the augmented Lagrangian technique reformulates the constrained optimization problem shown above as follows:

$$\{x_{est}, v_{est}, s_{est}\} =$$
$$\underset{x,v,s}{\operatorname{argmin}}(\|v\|_1 + l_{\sigma'}(s) + \mu_1 \|v - x - d_1\|_2^2 + \mu_2 \|y - Ax - s - d_2\|_2^2)$$

update: $d_1 \leftarrow d_1 - (v_{est} - x_{est})$ update: $d_2 \leftarrow d_2 - (y - Ax_{est} - s_{est})$ where $\mu_1$ and $\mu_2$ are some positive numbers;

and iteratively solves the reformulated equation for values of $x_{est}$, $v_{est}$, and $s_{est}$ to estimate the location of the target.

11. The system of claim 10, wherein the sparsity solver is configured to solve for values for $x_{est}$, $v_{est}$, and $s_{est}$ using the following equations:

$$v_{est} =$$

$$\operatorname{soft}(x_{est} + d_1, 1/2\, \mu_1) = \begin{cases} x_{est} + d_1 - 1/2\, \mu_1 & \text{if } x_{est} + d_1 - 1/2\, \mu_1 \ge 0 \\ 0 & \text{if } 1/2\, \mu_1 > |x_{est} + d_1| \\ x_{est} + d_1 + 1/2\, \mu_1 & \text{if } x_{est} + d_1 + 1/2\, \mu_1 \le 0 \end{cases}$$

$$s_{est} = \begin{cases} y - Ax_{est} - d_2 & \text{if } \|y - Ax_{est} - d_2\|_2 \le \sigma' \\ \sigma' \dfrac{y - Ax_{est} - d_2}{\|y - Ax_{est} - d_2\|_2} & \text{if } \|y - Ax_{est} - d_2\|_2 > \sigma' \end{cases}$$

$$x_{est} = (\mu_1 I + \mu_2 A^H A)^{-1}[\mu_2 A^H(y - s_{est} - d_2) + \mu_1(v_{est} - d_1)],$$

and iteratively solve these equations using the following procedure:

1. choose $\mu_1$ and $\mu_2$ and initialize $x_{est}$, $d_1$ and $d_2$
2. solve $$v_{est} = \underset{v}{\operatorname{argmin}}\, \|v\|_1 + l_{\sigma'}(s) + \mu_1 \|v - x - d_1\|_2^2$$

$$s_{est} = \underset{s}{\operatorname{argmin}}\, l_{\sigma'}(s) + \mu_2 \|y - Ax - s - d_2\|_2^2$$

$$x_{est} = \underset{x}{\operatorname{argmin}}\, \mu_1 \|v_{est} - x - d_1\|_2^2 + \mu_2 \|y - Ax - s_{est} - d_2\|_2^2$$

3. update: $d_1 \leftarrow d_1 - (v_{est} - x_{est})$
   update: $d_2 \leftarrow d_2 - (y - Ax_{est} - s_{est})$
4. and repeat steps 1-3 until location of the target is estimated.

12. A sensor system for estimating a location of a target using a sparse representation framework where at least one interfering transmitter is transmitting an interfering energy signal, comprising:

at least one transmitter for transmitting an energy signal in at least one direction, the energy signal reflecting off of at least the target;

a plurality of receiving elements for receiving energy signals including an energy signal-of-interest, the energy signal reflecting off of at least the target, transmitted interfering energy signals and coherent interference; and at least one receiver comprising at least one processor using the sparse representation framework for processing the received energy signals and using a sparsity solver for estimating the location of the interfering transmitter transmitting the interfering signal passively and a location of the target actively, wherein to passively estimate the location of the interfering transmitter transmitting the interfering signal the at least one processor using a sparse representation framework is configured to:

receive energy signals and separate the interfering energy signal present in a signal collection window of a plurality of signal collection windows in at least one of a spatial domain, a temporal domain and a frequency domain, so that only the interfering energy signal and associated coherent interference are present in the signal collection window;

convert the interfering energy signal and associated coherent interference present in each signal collection window from an energy signal in a time domain to an energy signal in a frequency domain;

divide the energy signal in the frequency domain in each signal collection window with a reference signal which is not equal to 0;

arrange a search grid around an area defined by an angle θ and a delay τ on the at least 2-D grid, where a frequency domain measurement ratio term for angle θ is represented as follows:

$$r_{n,m} = \frac{\sum_{k=1}^{K}\sum_{l=1}^{L} \alpha_{k,l} e^{-j2\pi f_m(\tau_k - \Delta t_{n,l})}}{\sum_{k=1}^{K}\sum_{l=1}^{L} \alpha_{k,l} e^{-j2\pi f_m(\tau_k - \Delta t_{n0,l})}}$$

where:
$r_{n,m}$ is the spectrum ratio measurement corresponding to the n-th element and the m-th frequency, $f_m$;
k=1 . . . K is the search indices corresponding to the delay search grid $\tau_k = \tau_1 \ldots \tau_K$;
l=1 . . . L is the search indices corresponding to the angle search grid $\theta_k = \theta_1 \ldots \theta_K$;
$\alpha_{k,l}$ is the unknown amplitude to be solved corresponding to the k-th delay search point and the l-th angle search point;
$\Delta t_{n,i} = (nd \sin \theta_l)/C$ is the relative delay of the signal received at the n-th element corresponding to the l-th angle search point;
$\Delta t_{n0,i} = (n0d \sin \theta_l)/C$ is the relative delay of the signal received at the reference element corresponding to the l-th angle on the angle search grid;
d is the spacing between elements;
C is the speed of light; and
j represents the square root of −1;
calculate all possible values for term $(\tau_k - \Delta t_{n,1})$ based on the search space defined by values of angle θ and values of delay τ, sort the calculated values for the term $(\tau_k - \Delta t_{n,1})$ from small to large and denote the sorted calculated values for the term $(\tau_k - \Delta t_{n,1})$ from small to large as follows:

$$\{\epsilon_{n,1}, \epsilon_{n,2} \ldots \epsilon_{n,V}\}$$

where: V=KL and the corresponding amplitudes are denoted as $\{\beta_1, \beta_2, \ldots, \beta_V\}$, which belong to the set of amplitudes α, and the terms corresponding to $(\tau_k - \Delta t_{n0,1})$ are now denoted as $\{\epsilon_{n0,1}, \epsilon_{n0,2} \ldots \epsilon_{n0,V}\}$, and are arranged based on the sorting sequence of the calculated values for $(\tau_k - \Delta t_{n,i})$ and are not necessarily in an ascending order;

rearrange the spectrum ratio equation using the new notations to obtain the following homogeneous spectrum ratio equation in matrix vector form;

$$\underbrace{\begin{bmatrix} \varphi_{11} & \cdots & \varphi_{V1} \\ \vdots & \ddots & \vdots \\ \varphi_{1M} & \cdots & \varphi_{VM} \end{bmatrix}}_{\varphi} \underbrace{\begin{bmatrix} \beta_1 \\ \vdots \\ \beta_V \end{bmatrix}}_{\beta} = \begin{bmatrix} 0 \\ \vdots \\ 0 \end{bmatrix}$$

where:
$\varphi_{im} = (r_{n,m} Z_m^{-\epsilon_{n0,i}} - Z_m^{-\epsilon_{n,i}})$ is the i-th row and m-th column element of φ; and
$Z = e^{j2\pi f_m}$;
the sparsity solver is configured to solve for β, and estimate a location of the interfering transmitter transmitting the interfering signal where the solution of β is spanned by the null space of φ, a correct β is sparse, and β cannot be zero; and
outputs the estimated location of the target; and wherein to actively estimate the location of the target the at least one processor using a sparse representation framework is configured to:

apply spatial nulling to suppress the interfering energy signal transmitted from the estimated location of the target transmitting the interfering energy signal;

detect the target in an azimuth-elevation-range resolution cell and establish a three-dimension (3-D) grid covering an area including the azimuth-elevation-range resolution cell containing the one or more targets;

reform the target location estimation problem into a linear angle-excess range estimation problem for the target represented in the general form:

$Ax = y$ where:
x is a solution vector,
A is a matrix of known functions, and
y is a vector from observation;

form a number of measurement equations, the number of measurement equations being equal to N×M, where N is the number of outputs from receiving elements of the sensor array, and M is the number of frequency sampling points available;

form a matrix based on the N×M measurement equations for the solution vector y and a K×L search space in the 3-D grid;

form a 3-D image of the K×L search space, where the solution vector x for the target on the 3-D image is sparse when a number of grid points within the K×L search space is larger than a number of grid points P having a value above a noise floor of the K×L search space (KL>>P);

apply the sparsity solver configured to solve the matrix for the solution vector x to estimate a location of the target, and output the estimated location of the target.

* * * * *